US008073872B2

(12) United States Patent
Fukata et al.

(10) Patent No.: US 8,073,872 B2
(45) Date of Patent: Dec. 6, 2011

(54) INFORMATION PROCESSING APPARATUS

(75) Inventors: Takuya Fukata, Osaka (JP); Takuya Shirai, Osaka (JP)

(73) Assignee: Kyocera Mita, Osaka (JP)

( * ) Notice: Subject to any disclaimer, the term of this patent is extended or adjusted under 35 U.S.C. 154(b) by 656 days.

(21) Appl. No.: 12/203,662

(22) Filed: Sep. 3, 2008

(65) Prior Publication Data

US 2009/0063493 A1 Mar. 5, 2009

(30) Foreign Application Priority Data

Sep. 4, 2007 (JP) ................................ 2007-228761
Sep. 4, 2007 (JP) ................................ 2007-228762
Sep. 4, 2007 (JP) ................................ 2007-228763
Sep. 4, 2007 (JP) ................................ 2007-228764
Sep. 4, 2007 (JP) ................................ 2007-228765
Sep. 4, 2007 (JP) ................................ 2007-228766
Sep. 4, 2007 (JP) ................................ 2007-228767
Sep. 4, 2007 (JP) ................................ 2007-228768
Sep. 4, 2007 (JP) ................................ 2007-228769
Sep. 4, 2007 (JP) ................................ 2007-228770
Sep. 4, 2007 (JP) ................................ 2007-228771

(51) Int. Cl.
*G06F 7/00* (2006.01)
*G06F 17/30* (2006.01)

(52) U.S. Cl. ......... 707/793; 707/790; 707/796; 707/802

(58) Field of Classification Search ........................ None
See application file for complete search history.

(56) References Cited

FOREIGN PATENT DOCUMENTS

JP 3862372 3/1999
JP 2006-155356 6/2006

*Primary Examiner* — Khanh Pham
*Assistant Examiner* — Azam Cheema
(74) *Attorney, Agent, or Firm* — Stephen Chin; VS&C LLP

(57) ABSTRACT

An information processing apparatus includes a processor and a memory unit connected to the processor. The memory unit stores a setting value and an web application. The web application causes the processor to change the setting value according to a request message from a client. The web application causes the processor to update the setting value stored in the memory unit with a setting value contained in a query string if the request message indicates a request for changing the setting value and the request message is transmitted from the client by a user with administrator privilege, and the web application causes the processor to insert a cookie having the setting value contained in the query string to a response header if the request message is transmitted from the client by a user without administrator privilege.

6 Claims, 19 Drawing Sheets

FIG.5B

39

| FILE PATH | BYTES |
|---|---|
| LOCAL/SHARE/SET/FAX.HTML | 7,052 |
| LOCAL/SHARE/SET/ADR.HTML | 10,874 |
| ⋮ | ⋮ |

FIG.11A

OK.HTML

```
<HTML>
<BODY>
   PROCESS RESULT : #MSG1#
</BODY>
</HTML>
```

FIG.11B

OK.HTM

```
<HTML>
<BODY>
   PROCESS RESULT : FAX TRANSMISSION OK
</BODY>
</HTML>
```

FIG.11C

NG.HTML

```
<HTML>
<BODY>
PROCESS RESULT : #MSG1#<BR>
CAUSE : #MSG2#
</BODY>
</HTML>
```

FIG.11D

NG.HTM

```
<HTML>
<BODY>
PROCESS RESULT : FAIL TO TRANSMIT FACSIMILE<BR>
CAUSE : NO RESPONSE
</BODY>
</HTML>
```

FIG.11E

OK.HTML

```
<HTML>
<BODY>
ATTENTION : FINISH TRANSMITTING TO #MSG1# AT #MSG2#<BR>
NUMBER OF TRASMITTED PAGES : #MSG3#
</BODY>
</HTML>
```

FIG.11F

OK.HTM

```
<HTML>
<BODY>
ATTENTION : ICHIRO SUZUKI : ABC CO., LTD. :012-345-6789 AT JULY
20, 2007: 09:03:12<BR>
NUMBER OF TRANSMITTED PAGES : 12
</BODY>
</HTML>
```

FIG.12A

FAXTRANSMISSION.HTML

```
<HTML>
<BODY>
<FORM ACTION="/IMAGE.CGI?FUNC=SENDFAX&OKFILE=OK.HTM&NGFILE=NG.HTM"
 METHOD="POST"   ENCTYPE="MULTIPART/FORM-DATA">
ATTENTION<SELECT>
<!- -  FOR F_GETCOUNTOFADDRESS- ->
   <OPTION  VALUE="#F_M_COUNT&ARG1=0#">#F_M_GETADDRESS#</OPTION>
<!- -  END_FOR  - ->
</SELECT>
TRASMISSION FILE<INPUT  TYPE="FILE"   NAME="FILEPATHFORSENDING"  SIZE="30">
<INPUT  TYPE="SUBMIT"  VALUE="FAX TRANSMISSION"><BR>
</FORM>
<FORM  ACTION="/GET.CGI?HTMFILE=/CHANGEFAXSETTINGS.HTM"  METHOD="GET">
<INPUT  TYPE="SUBMIT"  VALUE="FAX SETTING VALUE">
</FORM>
<FORM  ACTION="/GET.CGI?HTMFILE=/EDITADDRESSBOOK.HTM"  METHOD="GET">
<INPUT  TYPE="SUBMIT"  VALUE="OPEN ADDRESS BOOK"><BR>
</FORM>
</BODY>
</HTML>
```

FIG.12B

FAXTRANSMISSION.HTM

```
<HTML>
<BODY>
<FORM ACTION="/IMAGE.CGI?FUNC=SENDFAX&OKFILE=OK.HTM&NGFILE=NG.HTM"
 METHOD="POST"   ENCTYPE="MULTIPART/FORM-DATA">
ATTENTION<SELECT>
   <OPTION  VALUE="0">TARO SATO : XYZ CO. , LTD. : 345-678-9012</OPTION>
   <OPTION  VALUE="1">ICHIRO SUZUKI : ABC CO. , LTD. : 012-345-6789</OPTION>
                                    :
   <OPTION  VALUE="12">HANAKO YAMADA : PQR CO. , LTD. : 234-567-8901</OPTION>
</SELECT>
TRASMISSION FILE<INPUT  TYPE="FILE"   NAME="FILEPATHFORSENDING"  SIZE="30">
<INPUT  TYPE="SUBMIT"  VALUE="FAX TRANSMISSION"><BR>
<FORM  ACTION="/GET.CGI?HTMFILE=/CHANGEFAXSETTINGS.HTM"  METHOD="GET">
<INPUT  TYPE="SUBMIT"  VALUE="FAX SETTING VALUE">
</FORM>
<FORM  ACTION="/GET.CGI?HTMFILE=/EDITADDRESSBOOK.HTM"  METHOD="GET">
<INPUT  TYPE="SUBMIT"  VALUE="OPEN ADDRESS BOOK"><BR>
</FORM>
</BODY>
</HTML>
```

FIG.13A

EDITADDRESSBOOK.HTML

```
<HTML>
<BODY>
<FORM ACTION="/ SET.CGI?FUNC=EDITADDRESSBOOK&OKFILE=OK.HTM&NGFILE=NG.HTM"
 METHOD="POST">
<SELECT>
<!- -  FOR F_GETCOUNTOFADDRESS- ->
   <OPTION  VALUE="#F_M_COUNT&ARG1=0#">#F_M_GETADDRESS#</OPTION>
<!- -  END_FOR  - ->
</SELECT>
ATTENTION<INPUT  TYPE="TEXT"   NAME="TO"  SIZE="36">
<INPUT  TYPE="RADIO"  NAME="G1"  VALUE="0">ADD
<INPUT  TYPE="RADIO"  NAME="G1"  VALUE="1">CHANGE
<INPUT  TYPE="RADIO"  NAME="G1"  VALUE="2">DELETE<BR>
<INPUT  TYPE="SUBMIT"  VALUE="EXECUTE">
</FORM>

</BODY>
</HTML>
```

FIG.13B

EDITADDRESSBOOK.HTM

```
<HTML>
<BODY>
<FORM ACTION="/ SET.CGI?FUNC=EDITADDRESSBOOK&OKFILE=OK.HTM&NGFILE=NG.HTM"
 METHOD="POST">
<SELECT>
ATTENTION<SELECT>
   <OPTION  VALUE="0">TARO SATO : XYZ Co. , Ltd. :345-678-9012</OPTION>
   <OPTION  VALUE="1">ICHIRO SUZUKI : ABC Co. , Ltd. :012-345-6789</OPTION>
                                   ⋮
   <OPTION  VALUE="12">HANAKO YAMADA : PQR Co. , Ltd. :111-222-3333</OPTION>
</SELECT>
ATTENTION<INPUT  TYPE="TEXT"   NAME="TO"  SIZE="36">
<INPUT  TYPE="RADIO"  NAME="G1"  VALUE="0">ADD
<INPUT  TYPE="RADIO"  NAME="G1"  VALUE="1">CHANGE
<INPUT  TYPE="RADIO"  NAME="G1"  VALUE="2">DELETE<BR>
<INPUT  TYPE="SUBMIT"  VALUE="EXECUTE">
</FORM>
</BODY>
</HTML>
```

INFORMATION PROCESSING APPARATUS

CROSS-REFERENCE TO RELATED APPLICATIONS

This application relates to and claims priority rights from the following Japanese Patent Applications:

(1) Japanese Patent Application No. 2007-228762, filed on Sep. 4, 2007

(2) Japanese Patent Application No. 2007-228771, filed on Sep. 4, 2007

(3) Japanese Patent Application No. 2007-228769, filed on Sep. 4, 2007

(4) Japanese Patent Application No. 2007-228768, filed on Sep. 4, 2007

(5) Japanese Patent Application No. 2007-228767, filed on Sep. 4, 2007

(6) Japanese Patent Application No. 2007-228766, filed on Sep. 4, 2007

(7) Japanese Patent Application No. 2007-228765, filed on Sep. 4, 2007

(8) Japanese Patent Application No. 2007-228764, filed on Sep. 4, 2007

(9) Japanese Patent Application No. 2007-228761, filed on Sep. 4, 2007

(10) Japanese Patent Application No. 2007-228763, filed on Sep. 4, 2007

(11) Japanese Patent Application No. 2007-228770, filed on Sep. 4, 2007 the entire disclosures of which are hereby incorporated by reference herein.

BACKGROUND OF THE INVENTION

1. Field of the Invention

This invention relates to an information processing apparatus with an web server function capable of being controlled by a remote web client.

2. Description of the Related Art

In an image forming system, a terminal device is connected to an image forming apparatus via a network and can obtain and set-up information on operation of the image forming apparatus. In the image forming system, the image forming apparatus causes the terminal device to display a "my page" to indicate the information. In a "my page" of a user, items selected by the user are placed at the respective positions specified by the user. The items are transmitted as cookies to the image forming apparatus.

Further, it is known that in such image forming apparatus, an HTML file is dynamically generated based on an HTML template file by replacing an identifier in the HTML template file with data corresponding to the identifier.

Furthermore, it is known that a user can change his/her "my page" browsed to refer to various information in an image forming apparatus by using a terminal device connected to the image forming apparatus via a network. Item IDs are displayed in a "my page" for each of users. The item IDs have been stored either in the image forming apparatus or as a cookie in the terminal device. The image forming apparatus generates a "my page" file by replacing the item ID with data corresponding to the item ID and transmits the "my page" to the terminal device. In addition, in the terminal device, setting information is input on a setting page, the terminal device transmits the setting information to the image forming apparatus, and the image forming apparatus receives the setting information and updates setting information in itself with the received setting information.

Furthermore, it is known that in terms of a general web browser on a computer connected to a digital multi function peripheral, operation status of the digital multi function peripheral can be watched and the digital multi function peripheral can be controlled.

Such digital multi function peripheral has an HTTP server and a CGI script started on the HTTP server, always updates an HTML file that indicates operation status without a request from a client, and transmits the HTML file to the client as a response to a request from the client, and consequently in the client the operation status can be watched on real time basis.

Further, the digital multi function peripheral starts a CGI script according to a request from the client, and in terms of the CGI script, reads out an access log file and performs a statistical process, generates an HTML file that indicates the result of the process and transmits the HTML file to the client via the HTTP server.

Furthermore, the digital multi function peripheral starts a CGI script according to a request from the client, and controls operation of itself in terms of the CGI script.

SUMMARY OF THE INVENTION

It is an object of the present invention to provide an information processing apparatus with a non-complex configuration capable of handling both of setting values for each of users and common setting values to all users.

It is another object of the present invention to provide an information processing apparatus capable of using a non-complex template file for generating a file in which a plurality of strings are listed.

It is another object of the present invention to provide an information processing apparatus capable of replacing tokens with respective strings specified by the result of one function.

It is another object of the present invention to provide an information processing apparatus capable of generating an expressive file based on a template file.

It is another object of the present invention to provide an information processing apparatus with a non-complex configuration capable of coordination between a process to change a setting value and a process to notify the result of changing.

It is another object of the present invention to provide an information processing apparatus capable of reducing a required memory area.

It is another object of the present invention to provide an information processing apparatus that allows to extend functions of an web application easily.

It is another object of the present invention to provide an information processing apparatus that allows to simplify a configuration of an web application.

It is another object of the present invention to provide an information processing apparatus capable of reducing a required memory area and processing at high speed by running in a same process even if file names of program files in paths contained in request URIs are different from each other.

It is another object of the present invention to provide an information processing apparatus capable of a configuration that a thread is started when a request is received from a client, and capable of utilizing existent resources of web server software.

It is another object of the present invention to provide an information processing apparatus that allows to simplify descriptions in a text file stored in a memory unit on a server side.

The present invention solves these subject as follows.

An information processing apparatus of the first aspect of the present invention includes a processor and a memory unit connected to the processor. The memory unit stores a setting value and an web application. The web application causes the processor to change the setting value according to a request message from a client. The web application causes the processor to update the setting value stored in the memory unit with a setting value contained in a query string if the request message indicates a request for changing the setting value and the request message is transmitted from the client by a user with administrator privilege, and the web application causes the processor to insert a cookie having the setting value contained in the query string to a response header if the request message is transmitted from the client by a user without administrator privilege.

An information processing apparatus of the second aspect of the present invention includes the first aspect and the following feature. If the request massage contains a request of an image forming process and the cookie, the web application causes the processor to use a setting value with a name in the cookie and setting values with other names in the memory unit in the image forming process, An information processing apparatus of the second aspect of the present invention includes either the first aspect or the second aspect and the following feature. If the request massage indicates a request of obtaining setting values, the web application causes the processor to insert the setting value contained in the cookie and the other setting values in the memory unit to a response body.

According to the first aspect, if a request for changing a setting value is one from a user with administrator privilege, the setting value stored in the memory unit is updated; otherwise, the setting value is returned to a client as a cookie. Therefore, in terms of a non-complex configuration of the apparatus, it is prevented that a setting value common to all user is not changed carelessly. In addition, a setting value in a cookie and common setting values are used as setting values for a user, and a setting value in the cookie is used if both a setting value in the cookie and a common setting value are available to one setting item.

According to the second aspect, if a request message contains a request of an image forming process and a cookie, then the cookie and common setting values are used as setting values for a user in the image forming process. Therefore, in terms of a non-complex configuration of the apparatus, an image forming process is performed with setting values only for each of users.

According to the third aspect, in terms of a non-complex configuration, a set of a cookie and common setting values is obtained in terms of a request of obtaining the setting values.

An information processing apparatus of the fourth aspect of the present invention includes a processor, and a memory unit connected to the processor. The memory unit stores an web application and a template file. The template file contains a first directive and a second directive for defining an iterative portion and the first directive or the second directive contains an iterative condition, and the web application has a translator that causes the processor to generate a part or all of a response body by causing to perform a process of one or more statements between the first directive and the second directive repeatedly under the iterative condition.

An information processing apparatus of the fifth aspect of the present invention includes the fourth aspect and the following feature. The web application contains a function capable of having a plurality of return values, and if a context token is contained between the first directive and the second directive, the translator causes the processor to (a) call the function only at the first iteration and replace the context token with a string that is one selected from the return values according to the number of times of iteration.

An information processing apparatus of the fifth aspect of the present invention includes the fifth aspect and the following feature. The return values are element values of a dynamic array, and the translator causes the processor to replace the context token with one of the element values specified by a counter indicating the number of times of iteration used as an index of the array.

An information processing apparatus of the seventh aspect of the present invention includes any of the fourth to sixth aspects and the following feature. The translator causes the processor to replace the context token with a return value of a function corresponding to the context token if the upper limit value N is described as the context token.

According to the fourth aspect, since a process of at least a statement between the first directive and the second directive is performed repeatedly under the iterative condition, by using a context toke as the statement, the context token is replaced every iteration. Therefore, it is possible to use a non-complex template file for generating a file in which a plurality of strings is listed.

According to the fifth aspect, if a context token is contained between the first directive and the second directive, the function is called only at the first iteration and the context token is replaced with a string selected from the return values according to the number of times of iteration. Consequently, the context token is repeatedly replaced with a different value in the return values every iteration at high speed.

According to the sixth aspect, the return values are element values of a dynamic array and the context token is replaced with one of the element values specified by a counter indicating the number of times of iteration used as an index of the array. Therefore, since the index is linked to the number of times of iteration, a string to be replaced can be selected easily.

According to the seventh aspect, the context token is replaced with a return value of a function corresponding to the context token if the upper limit value N is described as the context token. Therefore, since the total number of times of iteration is variable, a file containing any number of strings is generated from one template file.

An information processing apparatus of the eighth aspect of the present invention includes a processor and a memory unit connected to the processor. The memory unit stores an web application and a template file. The web application includes a function, and a translator that causes the processor to replace a context token in the template file with a return value of the function in order to generate a response body. The context token contains an identifier and the function has a plurality of return values specified with the identifier.

An information processing apparatus of the ninth aspect of the present invention includes the eighth aspect and the following feature. Each of return values is an element value of one of arrays, and the identifier is an index that specifies the element value in the array.

An information processing apparatus of the tenth aspect of the present invention includes either the eighth aspect or the ninth aspect and the following feature. The web application has a plurality of functions and the functions have respective return values in a common format, and the context token is replaced with any of the return values of the functions.

According to the eighth aspect, since a context token with an identifier is replaced with a return value specified with the identifier, context tokens can be replaced with respective strings specified dynamically according to the result of executing the function. For instance, after a facsimile transmission process is executed in terms of a FAX transmission function, context tokens can be replaced with return values of the FAX transmission function including the result (i.e. success/failure), the end time if success, a cause if failure, etc. in relation to the facsimile transmission.

According to the ninth aspect, the return values are element values of an array, and the identifier is an index that specifies element values in arrays. Therefore, in terms of a non-complex configuration, one of the return values can be selected for a context token.

According to the tenth aspect, the web application has a plurality of functions and the functions have respective return values in a common format, and the context token is replaced with the return value of any of the functions. Therefore, since the functions have respective return values in a common format, the result (i.e. the return value) of any of the functions is applied to only one template file.

An information processing apparatus of the eleventh aspect of the present invention includes a processor, and a memory unit connected to the processor. The memory unit stores an web application and template files. The web application causes the processor to generate a response body with executing the steps of: (a) replacing a context token in one of the template files specified by a request message from a client with a predetermined string, and (b) performing the process (a) again if the string contains another context token.

An information processing apparatus of the twelfth aspect of the present invention includes the eleventh aspect and the following feature. In the process (a), the web application causes the processor to determine the type of the context token according to an identification code contained in the context token and replace the context token with a string according to a rule corresponding to the type of the context token.

An information processing apparatus of the thirteenth aspect of the present invention includes the twelfth aspect and the following feature. The memory unit further stores replacement tables of respective languages, and each of the replacement tables has token identifiers and strings corresponding to the respective token identifiers, and if the identification code in the context token indicates that the context token is a language context token, in the process (a), the web application causes the processor to determine a replacement table corresponding to a language specified by the context token, to retrieve contents of the replacement table for a token identifier corresponding to the context token, and to replace the context token with a string corresponding to the token identifier.

An information processing apparatus of the fourteenth aspect of the present invention includes the thirteenth aspect and the following feature. The memory unit further stores a database, and if the identification code in the context token indicates that the context token is a function context token, in the process (a), the web application causes the processor to replace the context token with a string derived from a function of which the name is contained in the context token, and the function causes the processor to obtain the string from the database.

An information processing apparatus of the fifteenth aspect of the present invention includes the fourteenth aspect and the following feature. At least one of the strings in the replacement tables contains the function context token.

According to the eleventh aspect, if a string with which a context token has been replaced contains another context token, the context token in the string is replaced with another string. For instance, even if a setting value (e.g. "10") in a text (e.g. "The number of current processing jobs is 10.") is placed at any position depend of a language of the text, a context token is replaced with the text that contains another context token of the setting value, and then the context token in the text is further replaced with a string of the setting value. Therefore, according to the eleventh aspect, it is possible to generate an expressive file based on a template file.

According to the twelfth aspect, an identification code indicating the type of a context token is contained in the context token, and the context token is replaced with a string according to a rule corresponding to the type of the context token. For instance, after a text is translated to a text in a specified language, a context token in the translated text is replaced with a setting value stored in a database. Therefore, it is possible to dynamically generate an expressive file based on a template file.

According to the thirteenth aspect, by using a language context token as the context token, the context token is replaced with a text in a specified language.

According to the fourteenth aspect, by using a function context token as the context token, the context token is replaced with a setting value obtained by a function from a database.

According to the fifteenth aspect, if a storing with which an original context token is replaced contains a function context token, replacement is substantially executed twice for the original context token.

An information processing apparatus of the sixteenth aspect of the present invention includes a processor, and a memory unit connected to the processor. The memory unit stores an web application. The web application includes (a) functions that respective ones of the functions cause the processor to set respective return values according to one or more arguments, (b) process control units that respective ones of the process control units cause the processor to execute respective processes in terms of using at least one of the functions either directly or indirectly, and (c) a process assigning unit that causes the processor to send a control to one of the process control units corresponding to a file name in a path contained in a request URI from a client.

An information processing apparatus of the seventeenth aspect of the present invention includes the sixteenth aspect and the following feature. The memory unit further stores a database, and the functions include a function that accesses the database according to an argument of the function.

According to the sixteenth aspect, in terms of the process assigning unit, a control is sent to one of the process control units corresponding to a file name in a path contained in a request URI from a client, and the process control unit causes the processor to execute a process in terms of using at least one of the functions either directly or indirectly. Therefore, a feature can be extended or changed easily by adding a new function to the aforementioned functions, by changing at least one of the aforementioned functions, or by adding a new process control unit to the aforementioned process control units. Consequently, a development period of a new product can be shortened.

According to the seventeenth aspect, since in terms of one of the functions capable of accessing the database, it is possible to process with data specified dynamically from the database.

An information processing apparatus of the eighteenth aspect of the present invention includes a processor, and a memory unit connected to the processor. The memory unit stores an web application, and setting values on image forming process. The web application comprises a SET process control unit that causes the processor to change at least one of the setting values according to a query string from a client, and causes to generate a response body based on a template file selected according to the result of changing at least one of the setting values.

An information processing apparatus of the nineteenth aspect of the present invention includes the eighteenth aspect and the following feature. The memory unit further stores template files used to generate the response body, the web application further includes a GET process control unit that causes the processor to generate the response body based on the template file, and the SET process control unit causes the processor to send path information of the template file to the GET process control unit to generate the response body in terms of the GET process control unit.

An information processing apparatus of the twentieth aspect of the present invention includes the nineteenth aspect and the following feature. The web application has a plurality of functions and the functions have respective return values in a common format, the SET process control unit causes the processor to change one of the setting values in terms of one of the functions specified by the query string, and the GET process control unit causes the processor to replace a context token with a return value of one of the functions specified by the context token in the template file.

An information processing apparatus of the twenty-first aspect of the present invention includes the twentieth aspect and the following feature. The web application has a translator. The GET process control unit causes the processor to send the path information to the translator and to generate the response body in terms of the translator. The translator causes the processor to send a context token in the template file to a function specified by the context token and to replace the context token with a return value of the function.

According to the eighteenth aspect, at least one of the setting values is changed according to a query string from a client, and a response body is generated based on a template file selected according to the result of changing at least one of the setting values. Therefore, with a non-complex configuration, coordination is achieved between a process to change a setting value and a process to notify the result of changing.

According to the nineteenth aspect, a process for changing a setting value is executed in terms of the SET process control unit and a response message indicating the result of the process is generated in terms of the GET process control unit. Therefore, since the response message is generated in terms of the GET process control unit rather than the SET process control unit, it is possible to use a non-complex configuration of the SET process control unit.

According to the twentieth aspect, since changing and replacing are executed with the functions that have respective return values in a common format, the configuration of the web application can be changed easily.

According to the twenty-first aspect, under the control of the GET process control unit a context token is replaced in terms of the translator and the function. Since programs in the web application have a layer structure, the configuration of the web application can be changed easily.

An information processing apparatus of the twenty-second aspect of the present invention includes a processor, and a memory unit connected to the processor. The memory unit stores an web application, setting values on image forming process and a template files used to generate response bodies. The web application includes a first processing unit; a second processing unit that runs in the same process as the first processing unit; and a process assigning unit that causes the processor to assign a process to either the first processing unit or the second processing unit according to a file name in a path contained in a request URI from a client.

An information processing apparatus of the twenty-third aspect of the present invention includes the twenty-second aspect and the following feature. The first processing unit is a GET process control unit that causes the processor to generate a response body based on one of the template files selected according to a query string from a client. The second processing unit is a SET process control unit that causes the processor to change at least one of the setting values according to a query string from a client.

An information processing apparatus of the twenty-fourth aspect of the present invention includes the twenty-third aspect and the following feature. The SET process control unit causes the GET process control unit to generate a response body based on one of the template files selected according to the query string and the result of changing at least one of the setting values.

An information processing apparatus of the twenty-fifth aspect of the present invention includes the twenty-fourth aspect and the following feature. The GET process control unit causes the processor to generate a response body based on one of the template files selected according to a query string independent of the result of changing at least one of the setting values.

An information processing apparatus of the twenty-sixth aspect of the present invention includes any of the twenty-third to twenty-fifth aspects and the following feature. The web application further includes an image processing control unit that causes the processor to process contents of a file specified in a request body from a client, and causes the GET process control unit to generate a response body based on a template file selected according to the query string and the result of processing the contents. The process assigning unit causes the processor to assign a process to the image processing control unit if the image processing control unit is specified by the file name.

An information processing apparatus of the twenty-seventh aspect of the present invention includes any of the twenty-third to twenty-sixth aspects and the following feature. The web application further comprises an authentication control unit that causes the processor to determine whether or not a set of an ID and a password in the query string has been registered, and causes the GET process control unit to generate a response body based on one of the template files selected according to the query string and the result of determining whether or not the set has been registered. The process assigning unit causes the processor to assign a process to the authentication control unit if the authentication control unit is specified by the file name.

An information processing apparatus of the twenty-eighth aspect of the present invention includes any of the twenty-third to twenty-seventh aspects and the following feature. Each of the process assigning unit, the GET process control unit and the SET process control unit is either a function or a subroutine in the web application.

According to the twenty-second aspect, a process is assigned to one of the first and second processing units that run in the same process regardless of the file name. Therefore, since it is not required to switch a process by a context switch and it is not required to allocate resources every process switch, a required memory area is reduced.

According to the twenty-fourth aspect, in terms of the GET process control unit a response body is generated corresponding to the result of changing at least one of the setting values by the SET process control unit. Therefore, since a GET process is available in a SET process, it is possible to use a non-complex configuration of the web application.

According to the twenty-fifth aspect, the GET process control unit is available without the SET process control unit. Therefore, in terms of the GET process control unit and the SET process control unit, various sorts of processes can be executed.

According to the twenty-sixth aspect, since the GET process control unit is also used for an image processing, it is possible to use a non-complex configuration of the web application.

According to the twenty-seventh aspect, since the GET process control unit is also used for the authentication control unit, it is possible to use a non-complex configuration of the web application.

According to the twenty-eighth aspect, since the web application is divided into programs with respective features, it is possible to shorten a development period and to change the configuration of the web application easily.

An information processing apparatus of the twenty-ninth aspect of the present invention includes a processor, and a memory unit connected to the processor. The memory unit stores an web application that contains a plurality of functions. The functions have respective return values in a common format.

An information processing apparatus of the thirtieth aspect of the present invention includes the twenty-ninth aspect and the following feature. Each of the functions itself can set the number of return values to two or more.

An information processing apparatus of the thirty-first aspect of the present invention includes the thirtieth aspect and the following feature. The memory unit further stores a database and a template file. The web application causes the processor either to change a setting value in the database in terms of one of the functions corresponding to a request message from a client or to replace a context token in the template file with a string to generate a response body based on the template file.

An information processing apparatus of the thirty-second aspect of the present invention includes the thirty-first aspect and the following feature. The web application causes the processor to perform an image forming process in terms of one of the functions corresponding to the request message. A first return value of the return values has information on the result of either changing the setting value or the image forming process. A second return value of the return values has information on a cause of failure indicated by the result of either changing the setting value or the image forming process. The web application causes the processor to generate a part or all of the response body by replacing the context token with the second return value if the first return value indicates failure of either changing the setting value or the image forming process.

An information processing apparatus of the thirty-third aspect of the present invention includes the thirtieth aspect and the following feature. The template file contains a first directive and a second directive for defining an iterative portion and the first directive or the second directive contains an iterative condition. The web application causes the processor to perform a process of one or more statements between the first directive and the second directive repeatedly under the iterative condition. If the one or more statements contain(s) a multi-return-value function context token, the web application causes the processor to call one of the functions specified by the multi-return-value function context token only at the first iteration and to replace the multi-return-value function context token with a string selected from return values of the function according to the number of times of iteration.

An information processing apparatus of the thirty-fourth aspect of the present invention includes any of the thirtieth to thirty-third aspects and the following feature. The return values are element values of a dynamic array.

An information processing apparatus of the thirty-fifth aspect of the present invention includes the thirty-third aspect and the following feature. The return values are element values of a dynamic array. The web application causes the processor to replace the multi-return-value function context token with one of the element values specified by a counter used as an index of the array, and the counter indicates the number of times of iteration on the one or more statements.

According to the twenty-ninth aspect, since the functions in the web application have respective return values in a common format, it is possible to simplify a configuration of the web application and to design it easily by a team. Therefore, it is possible to shorten a development period to extend or change a feature of the web application.

According to the thirtieth aspect, each of the functions itself can set the number of return values to two or more. Therefore, information obtained by execution of a function can be used for different purposes in different places.

According to the thirty-first aspect, functions that have respective return values in a common format are used for respective processes of either changing a setting value in the database or replacing a context token with a string. Therefore, it is possible to use a non-complex configuration of the web application and to design it easily by a team.

According to the thirty-second aspect, if the first return value indicates failure of either changing the setting value or the image forming process, a context token in the template file is replaced with the second return value in order to generate a part or all of a response message. Therefore, information obtained by execution of a function can be used for different purposes in different places, and consequently it is possible to use a non-complex configuration of the web application.

According to the thirty-third aspect, only at the first iteration one of the functions specified by the multi-return-value function context token is called and the multi-return-value function context token is replaced with a string selected from return values of the function according to the number of times of iteration. Therefore, it is possible to use a non-complex configuration of the web application.

According to the thirty-fourth aspect, since the return values are element values of a dynamic array, interfaces of the functions are non-complex and easy to be used.

According to the thirty-fifth aspect, the multi-return-value function context token is replaced with one of the element values specified by a counter used as an index of the array, where the counter indicates the number of times of iteration on the one or more statements. Therefore, Therefore, it is possible to use a non-complex configuration of the web application.

An information processing apparatus of the thirty-sixth aspect of the present invention includes a processor, and a memory unit connected to the processor. The memory unit stores a program and a setting value. The program includes: (a) a super server that causes the processor to watch ports, determine whether or not a connection request on a port from a client is accepted according to the setting value and to start a server corresponding to the port if it is determined that a connection request on the port is accepted, (b) a main web server that causes the processor to generate an HTTP processing thread upon receipt of a request message and to transmit a response message to the client in terms of the HTTP processing thread, where the response message is corresponding to the request message, and (c) a mediation web server that is started by the super server and causes the processor to notify the main web server of receipt of a request message from the client from who the connection request is accepted and then to end itself.

An information processing apparatus of the thirty-seventh aspect of the present invention includes the thirty-sixth aspect and the following feature. The mediation web server has been generated by compiling a feature for causing the processor to notify the main web server of receipt of the request message and then to end itself.

An information processing apparatus of the thirty-eighth aspect of the present invention includes either the thirty-sixth aspect or the thirty-seventh aspect and the following feature. The main web server comprises a message generating unit that causes the processor to generate a response body and a part or all of a response header according to a request from the HTTP processing thread and to send the response body and a part or all of the response header to the HTTP processing thread. If a part of the response header is sent, the HTTP processing thread causes the processor to add a remaining part to the part of the response header to make a response message and to send the response message to the client.

An information processing apparatus of the thirty-ninth aspect of the present invention includes the thirty-eighth aspect and the following feature. The HTTP processing thread causes the processor to set pieces of information in the request message to respective variables in order to transfer the information to the message generating unit.

An information processing apparatus of the fortieth aspect of the present invention includes the thirty-ninth aspect and the following feature. The variables contain a variable that holds either a request URI or a path in a request URI. The message generating unit causes the processor to determine the variable indicates either a request for a static resource or a request for a dynamic resource, and if it is determined that the variable indicates a request for a dynamic resource, to execute a process corresponding to a body part of a file name contained in the variable, and the process is any of processes: obtaining the setting value, changing the setting value and assigning an image forming process.

According to the thirty-sixth aspect, a general super server with security feature to watch ports and to control connections to the ports can be used via the mediation server, in order to generate HTTP processing threads for responding to a request message in the main web server using a small memory area. Therefore, it is possible to use a non-complex configuration of the main web server, and a development period of the main web server is shortened.

According to the thirty-seventh aspect, since the size of the mediation server is reduced, a required memory area is reduced.

According to the thirty-ninth aspect, in terms of the HTTP processing thread pieces of information in the request message are set to respective variables. Therefore, since processes can be executed with reference to the variables, the processes are non-complex to be executed without reference to the request message.

According to the fortieth aspect, only if the type of the requested resource is a predetermined one, a subroutine is started rather than starting a new process. Therefore, a required memory area is reduced.

An information processing apparatus of the forty-first aspect of the present invention includes a processor, and a memory unit connected to the processor. The memory unit stores an web application and template files. The memory unit includes a RAM. The web application causes the processor to allocate a temporary memory area in the RAM and to generate a response body in the temporary memory area based on one of the template files specified by a request message from a client, and the temporary memory area is allocated in consideration of the size of the template file.

An information processing apparatus of the forty-second aspect of the present invention includes the forty-first aspect and the following feature. The memory unit further stores a table that contains respective file paths of the template files and respective memory sizes corresponding to the sizes of the template files. The web application causes the processor to obtain a one of the memory sizes corresponding to the specified template file from the table and to allocate the temporary memory area according to the memory size.

An information processing apparatus of the forty-third aspect of the present invention includes the forty-second aspect and the following feature. The web application causes the processor to determine whether or not the temporary memory area becomes short while the response body is being generated and to expand the temporary memory area when it is determined that the temporary memory area becomes short.

According to the forty-first aspect, a temporary memory area is allocated in the RAM in consideration of the size of the specified template file and a response body is generated in the temporary memory area based on the template file. Therefore, it is prevent to allocate a redundant memory area and consequently, the information processing apparatus can be provided at low cost.

According to the forty-second aspect, a size of the temporary memory area to be allocated is decided with reference to the table. Therefore, since calculating the size is not required for the specified template file, the temporary memory area is allocated in a short time.

According to the forty-third aspect, when it is determined that the temporary memory area becomes short, the temporary memory area is expanded. Therefore, the temporary memory area is allocated adequately without a redundant memory area.

An information processing apparatus of the forty-fourth aspect of the present invention includes a processor, and a memory unit connected to the processor. The memory unit stores programs and setting data. The programs contain an web server and an web application. The setting data substantially contains either a virtual file path or a virtual directory path. The web server comprises a first assigning unit that causes the processor to determine whether or not a path in a request URI from a client is substantially either identical to the virtual file path or under the virtual directory path, and if it is determined that a path in a request URI from a client is substantially either identical to the virtual file path or under the virtual directory path, send a control to the web application. Here, "The setting data substantially contains either a virtual file path or a virtual directory path" means that the setting data may contain a real path corresponding to either a virtual file path or a virtual directory path, and "a path in a request URI from a client is substantially either identical to the virtual file path or under the virtual directory path" means that a path in a request URI from a client may be either identical to a real path corresponding to the virtual file path or under a real path corresponding to the virtual directory path.

An information processing apparatus of the forty-fifth aspect of the present invention includes the forty-fourth aspect and the following feature. The first assigning unit causes the processor to determine whether or not an extension of the file name is a predetermined one, and if it is determined that an extension of the file name is not a predetermined one, to determine whether or not a path in a request URI from a client is either identical to the virtual file path or under the virtual directory path.

An information processing apparatus of the forty-sixth aspect of the present invention includes the forty-fifth aspect and the following feature. The web server further comprises a static resource processing unit that causes the processor to obtain a static resource specified by the path and to use the static resource as a request body. If it is determined that the extension of the file name is not the predetermined one and it is determined that the path is neither identical to the virtual file path nor under the virtual directory path, the first assigning unit causes the processor to send a control to the static resource processing unit with the path.

An information processing apparatus of the forty-seventh aspect of the present invention includes any of the forty-fourth to forty-sixth aspects and the following feature. The web application includes: (a) a GET process control unit that causes the processor to generate a response body based on a template file specified by the path, and (b) a second assigning unit that causes the processor to determine whether or not a file name in the path is a file name of a program, and if it is determined that a file name in the path is not a file name of a program, to send a control to the GET process control unit with the path.

An information processing apparatus of the forty-eighth aspect of the present invention includes the forty-seventh aspect and the following feature. If it is determined that a file name in the path is not any of file names of the programs stored in the memory unit, it is determined that a file name in the path is not a file name of a program.

An information processing apparatus of the forty-ninth aspect of the present invention includes either the forty-seventh aspect or the forty-eighth aspect and the following feature. The first assigning unit, the second assigning unit and the GET process control unit run in a same process.

According to the forty-fourth aspect, in the web server, if it is determined that a path in a request URI from a client is substantially either identical to the virtual file path or under the virtual directory path, a control is sent to the web application. Therefore, a control can be sent to the web application without a program file path for sending a control. Consequently, it is possible to reduce a description in a text file stored in a memory unit on the server side.

According to the forty-fifth aspect, if a program file path is set in a request URI, the first assigning unit can send a control to the web application without determining whether or not a path in a request URI from a client is substantially either identical to the virtual file path or under the virtual directory path. Therefore, the process in the first assigning unit is executed in a short time.

According to the forty-sixth aspect, without a program file path to send a control is, a control can be sent to the static resource processing unit properly.

According to the forty-seventh aspect, in case that a program file path to send a control is not specified, by setting a path to a template file in the request URI, a control can be sent to the GET process control unit to generate a response body based on the template file.

According to the forty-eighth aspect, even if a file name in the path is not any of file names of the programs stored in the memory unit, the path is processed by the GET process control unit.

According to the forty-ninth aspect, it is possible to achieve coordination among the first assigning unit, the second assigning unit and the GET process control unit, and processes in them are executed at high speed and a required memory area is reduced.

These and other objects, features and advantages of the present invention will become more apparent upon reading of the following detailed description along with the accompanied drawings.

BRIEF DESCRIPTION OF THE DRAWINGS

FIG. 5B shows a buffer size table that contains paths of respective HTML template files and the numbers of bytes set according to file sizes of the respective HTML template files;

FIG. 11A shows a template file that contains a message token, generally used when a process is finished successfully, FIG. 11B shows an HTML file generated based on the HTML template file in FIG. 11A by an HTML translator, FIG. 11C shows a template file that contains a message token generally used when a process is finished unsuccessfully, FIG. 11D shows an HTML file generated based on the HTML template file in FIG. 11C by an HTML translator, FIG. 11E shows a template file that contains a message token, generally used when a facsimile transmission process is finished successfully, and FIG. 11F shows an HTML file generated based on the HTML template file in FIG. 11E by an HTML translator;

FIG. 12A shows an HTML template file that contains a multi-return-value function token, used to generate an HTML file for the screen shown in FIG. 9B, and FIG. 12B shows an HTML file generated based on the HTML template file in FIG. 12A by an HTML translator;

FIG. 13A shows an HTML template file that contains a multi-return-value function token, used to generate an HTML file for the screen shown in FIG. 9C, and FIG. 13B shows an HTML file generated based on the HTML template file in FIG. 13A by an HTML translator;

DETAILED DESCRIPTION OF THE PREFERRED EMBODIMENT

Figure 15:
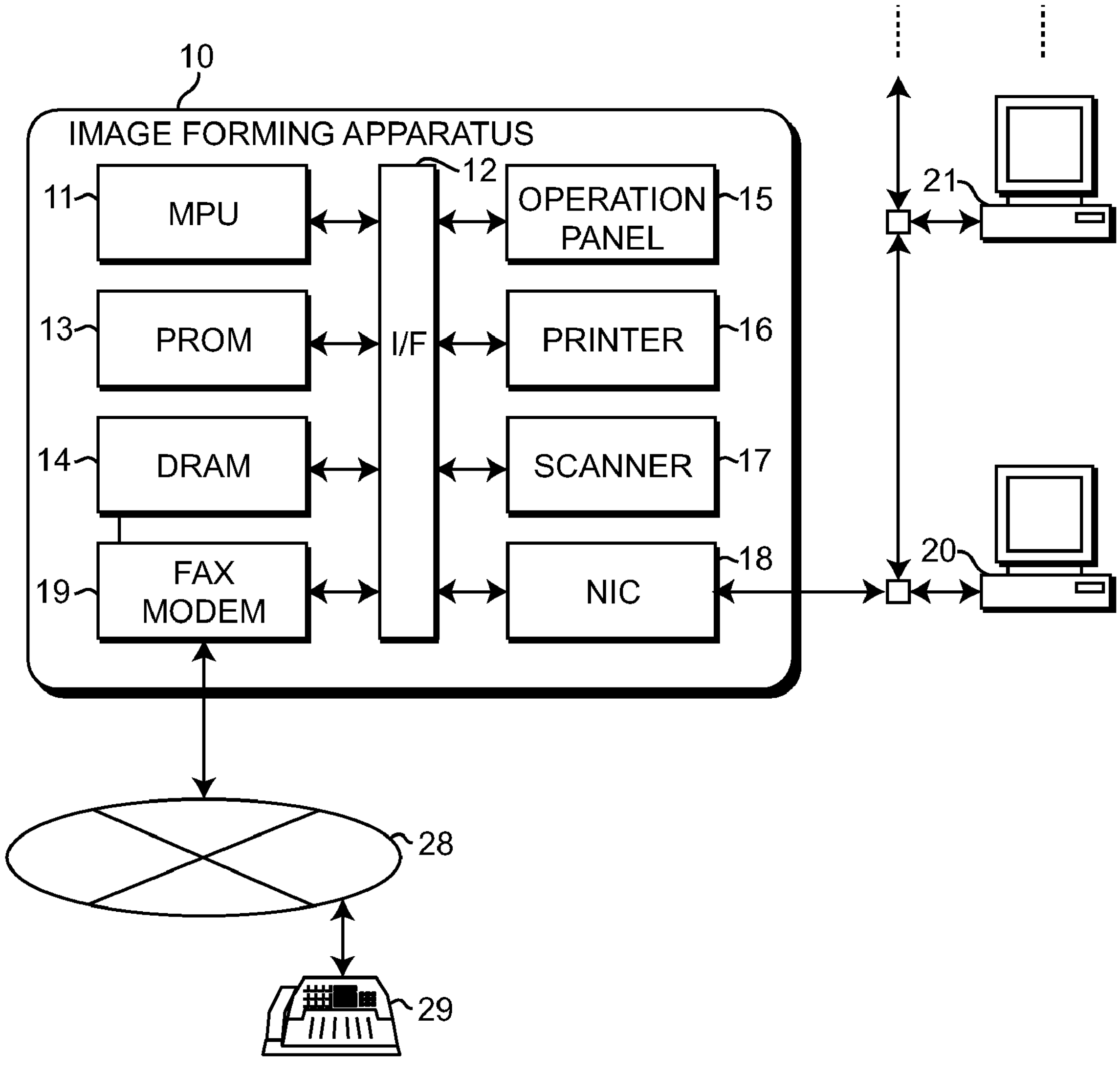
FIG. 15 shows a schematic functional block diagram that indicates a hardware configuration in an image forming system according to an embodiment of the present invention.

FIG. 15 shows a schematic functional block diagram that indicates a hardware configuration in an image forming system according to an embodiment of the present invention.

An image forming apparatus 10 as an information processing apparatus is a multi function peripheral capable of copy, print, facsimile transmission and receipt, and email transmission. The image forming apparatus 10 acts as an web server machine of HTTP (Hypertext Transfer Protocol) capable of being controlled from a remote host computer in an intranet by a general web browser.

In the image forming apparatus 10, a PROM 13, a DRAM 14, an operation panel 15, a printer 16, a scanner 17, a network interface card (NIC) 18 and a facsimile modem 19 are connected to an MPU 11 via an interface 12. In FIG. 15, for simplicity, a plurality of interfaces is depicted as one block.

The PROM 13, for instance a flash memory, stores a general operating system (OS), an web server, an web application (including an image forming processing program), and various data mentioned below. The OS has a multi-process function and a multi-thread function, for example Linux®.

In the DRAM 14, a work area is allocated to store instances of multi-processing and multi-threading, request messages and response messages and other related data, and then the work area can be released if unnecessary. The operation panel 15 detects input of a setting value or an instruction from a user and displays setting screens, operation status, etc. The printer 16 has a print engine, a paper drawer, a paper transportation unit and a paper output unit. In the printer 16, bitmap data is supplied from the DRAM 14, an electrostatic latent image is formed on a photoconductor drum according to the data, a toner image is developed from the electrostatic latent image and transferred and fixed on a sheet, and then the sheet is output. The scanner 17 scans an image of a document for copy or facsimile transmission. The NIC 18 is connected to web client machines 20, 21, . . . via a wired communication medium or a wireless communication medium. The facsimile modem 19 is connected to a facsimile machine 29 via a public line network 28.

Figure 1:
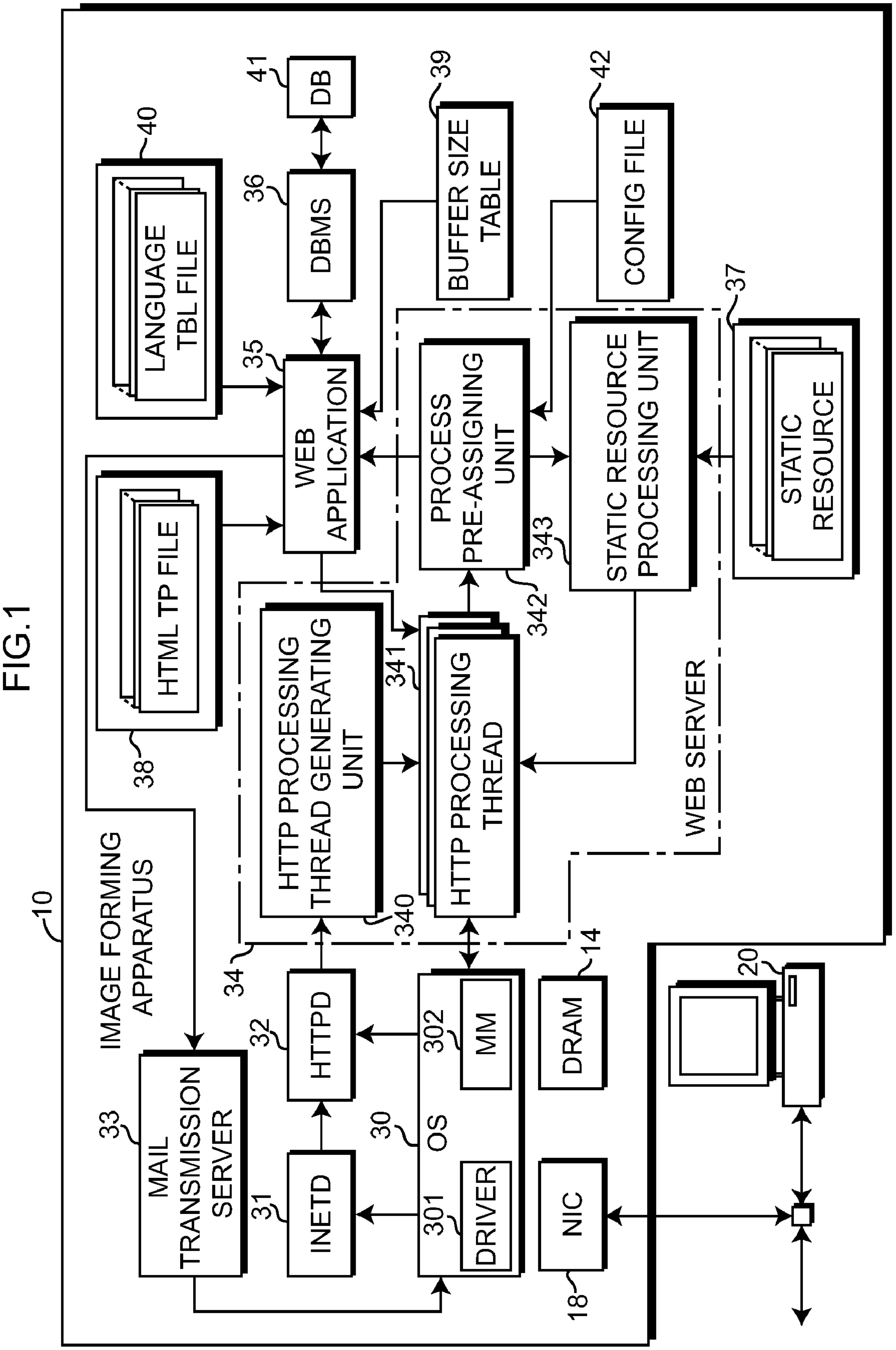
FIG. 1 shows a functional block diagram that mainly indicates a software configuration in an image forming apparatus.

FIG. 1 shows a functional block diagram that mainly indicates a software configuration in the image forming apparatus 10.

The image forming apparatus 10 has an OS 30, an inetd 31 and an httpd 32, a mail transmission server 33, a main web server 34, an web application 35, and a DBMS (database management system) 36 as programs in the PROM 13, and a static resource 37, HTML template files 38, a buffer size table 39, language table files 40, a database 41 and a configuration file 42 as data in the PROM 13.

The inetd 31, the httpd 32 and the mail transmission server 33 are general programs. The letter "d" in the inetd 31 and the httpd 32 means daemon, and the inetd 31 and the httpd 32 run in respective different processes. The main web server 34, the web application 35 and the DBMS 36 run in a common process.

Since the inetd 31 is an existent resource i.e. generally used, using the inetd 31 simplifies a configuration of the main server 34. The inetd 31 called a super server, watches a port described in a definition file. In the definition file, a program corresponding to the port is specified. When a TCP connection is established with a client via the port, the inetd 31 starts the program corresponding to the port. In this embodiment, the inetd 31 watches only the port 80, and every time when a TCP connection is established with a client via the port 80, the inetd 31 starts the httpd 32. The inetd 31 has a security feature (filtering). In this embodiment, the inetd 31 accepts a connection request only from a client that has a local IP address described in the definition file.

The httpd 32 is used to prevent the main web server 34 from being started every time when a connection request is accepted by the inetd 31. After the main web server 34 starts only once when the system starts, threads corresponding to respective requests can be generated and run in parallel in the main web server 34. Therefore, a required memory area is smaller than one in case that processes are generated corresponding to respective requests.

According to this embodiment, since existent resources such as inetd and httpd are available, it is possible to use a non-complex configuration of the main web server, and a development period of the main web server is shortened.

After being started, the httpd 32 receives a request message via the NIC 18 and the OS 31 from the web client machine 20 with which a TCP connection has been established by the inetd 31, and sends the request message via a pipe to the main web server 34, and then deletes itself on the DRAM 14. In other words, the httpd 32 acts as a mediation server. The httpd 32 may be generated with compiling only a part required for the mediation, in order to reduce a required memory area in the apparatus.

In the main web server 34, an HTTP processing thread generating unit 340 generates an HTTP processing thread 341 upon receiving a request message from the httpd 32, and starts the HTTP processing thread 341 with delivering an identifier of the request message to a constructor of the HTTP processing thread 341.

The HTTP processing thread 341 parses the request message to extract (a) a path in a request URI, (b) a query string, and a name and a value of each field in case of a GET method, and (c) a name and a value in case of a POST method, and sets each of them in a predetermined element in a structure variable (hereinafter called a "S variable"). The HTTP processing thread 341 invokes the process pre-assigning unit 342 with an identifier of the S variable (hereinafter called a "S identifier") as an argument. In this specification, a "query string" includes a query string in a GET method but also a string described in a POST method in the same way as a query string in a GET method.

In processes mentioned below, when information in the request message is required, elements in the S variable are used to simplify processes. Hereinafter, the element having a path in a request URI is called "S-variable.path", and the element having a query string is called "S-variable.queryString".

Figure 3:
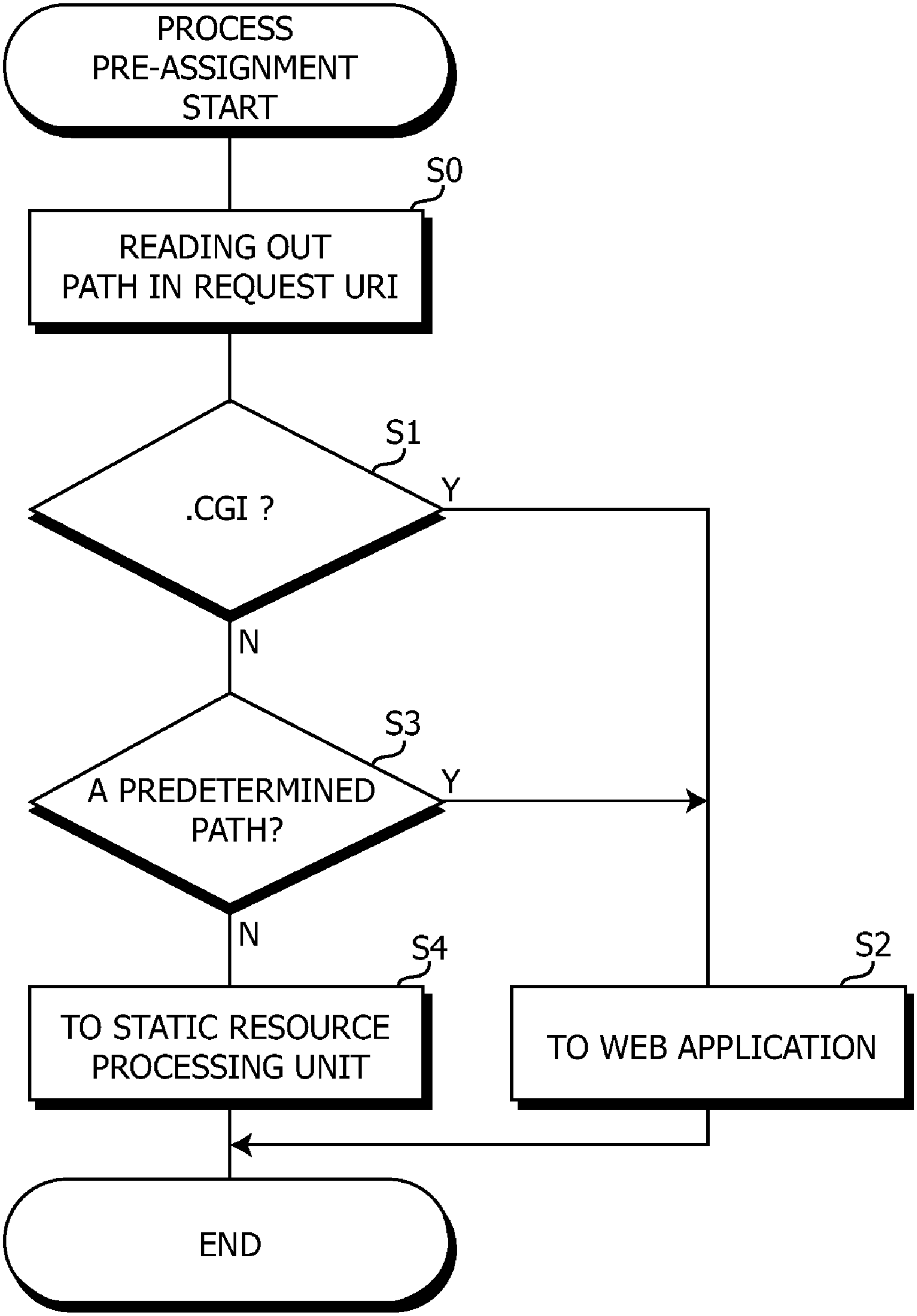
FIG. 3 shows a flowchart that indicates a process executed by the process pre-assigning unit in FIG. 1.

FIG. 3 shows a flowchart that indicates a process executed by the process pre-assigning unit 342. Along the flowchart, a process executed by the process pre-assigning unit 342 is explained next.

(Step S0) read out the S-variable.path.

(Step S1) go to Step S2 if an extension of a file name in the S-variable.path is "cgi"; otherwise go to Step S3.

(Step S2) call the web application 35 with the S identifier as an argument, and then end the process described in FIG. 3.

(Step S3) go to Step S2 if the S-variable.path read out in Step S0 is either identical to a file name or under a directory path, where the file name and the directory path are described at a source file item in the configuration file 42; otherwise go to Step S4. Here, if a path in a request is a predetermined path, then the request is one for "get.cgi" mentioned below that is one of CGI programs.

(Step S4) invoke the static resource processing unit 343 with the S identifier as an argument.

Upon being invoked, the static resource processing unit 343 reads out contents of a file identified by the S-variable-.path from the static resource 37 to the DRAM 14, and delivers the identifier to the HTTP processing thread 341 corresponding to the request. Upon receiving the identifier, the HTTP processing thread 341 attaches a response header to the contents of the file to generate a response message, and then transmits the response message to the web client machine 20 via the OS 30 and the NIC 18.

According to this embodiment, if it is determined that a path in a request URI from a client is either identical to a virtual file path or under a virtual directory path where the virtual file path and the virtual directory path are described at a source file item in the configuration file 42, a control is sent to the web application 35. Therefore, a control can be sent to the web application 35 without a program file path to send a control. Consequently, it is possible to reduce a description in text files (i.e. the static resource 37 and the HTML template file 38).

Figure 2:
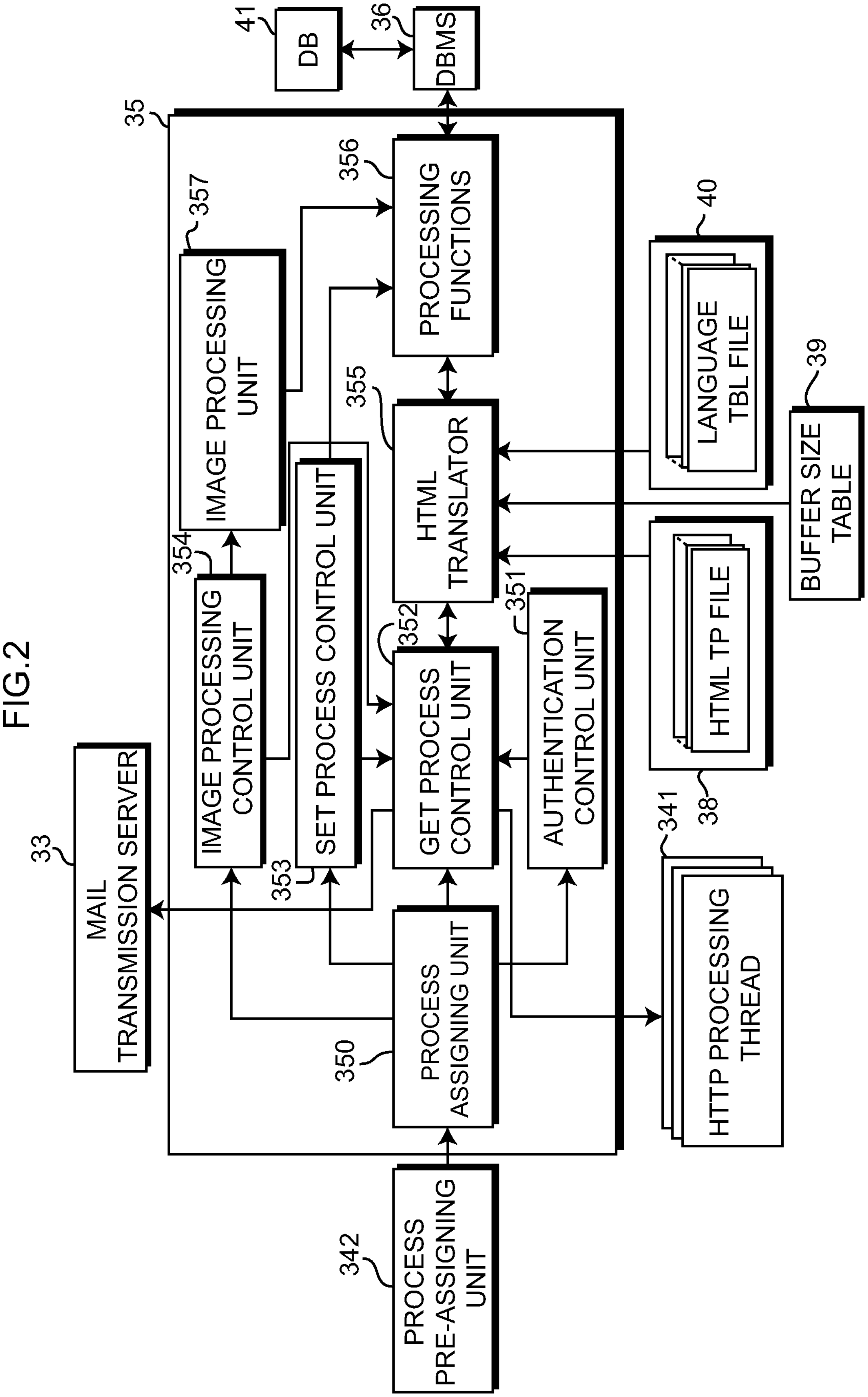
FIG. 2 shows a functional block diagram that mainly indicates a configuration of the web application in FIG. 1.

A process of the web application 35 invoked by the process pre-assigning unit 342 is explained next. FIG. 2 shows a functional block diagram that mainly indicates a configuration of the web application 35.

Figure 4:
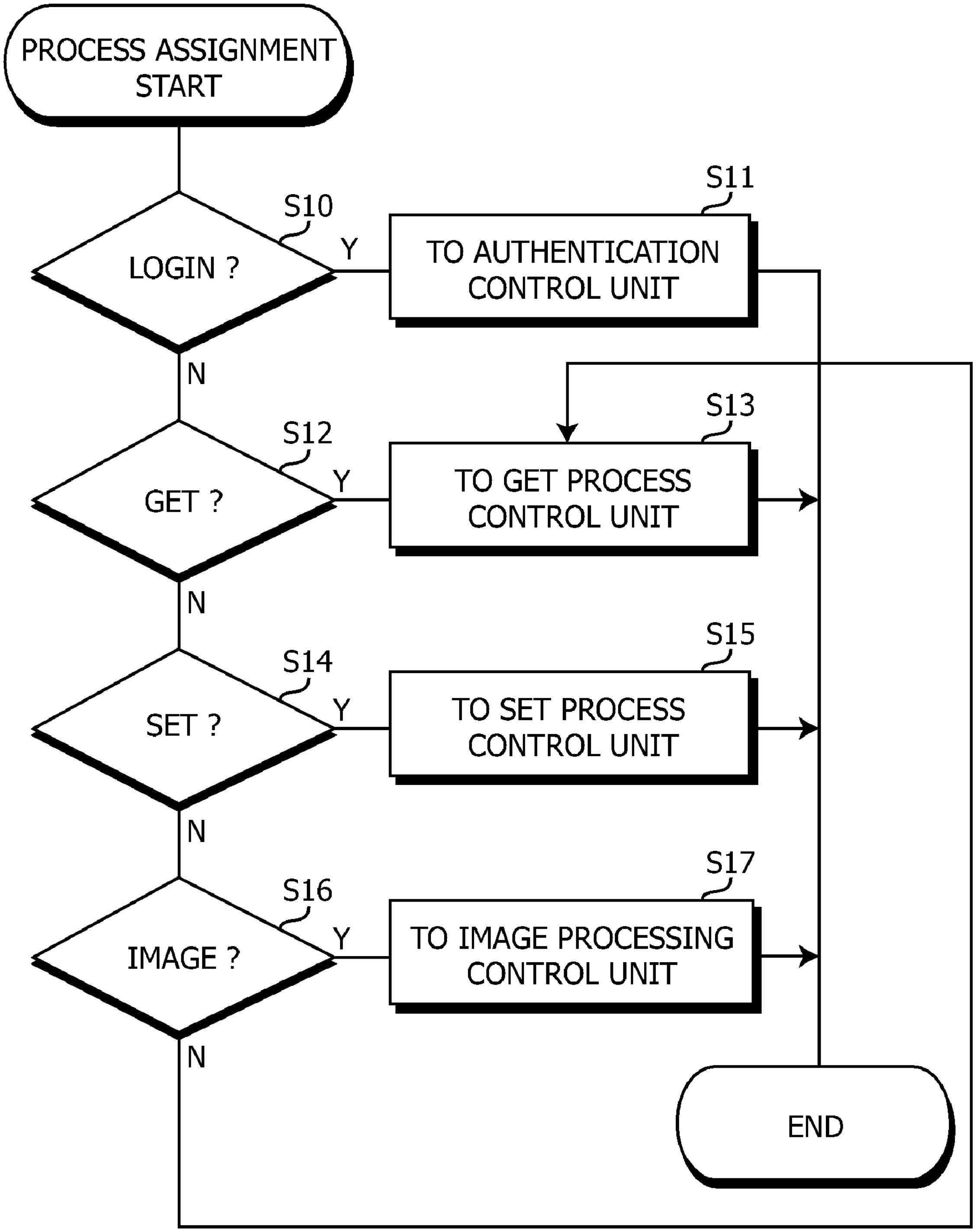
FIG. 4 shows a flowchart that indicates a process executed by the process assigning unit in FIG. 2.

The pre-assigning unit 342 calls a process assigning unit 350 when invoking the web application 35. FIG. 4 shows a flowchart that indicates a process executed by the process assigning unit 350.

Although in ordinary techniques CGI programs are started as respective different processes, in this embodiment, CGI programs are started as respective functions (or subroutine) in one process. Therefore, in this embodiment delay due to communication among processes does not take place, and since CGI programs use a common resource, a required memory area is reduced. This technique exploits advantages of CGI without disadvantages of CGI.

(Steps S10 and S11) invoke an authentication control unit 351 with the S identifier as an argument and then end the process described in FIG. 4 if a body of a file name in the S-variable.path is "login". A body of a file name means a remaining part other than a delimiter and an extension in a file name, e.g. "aaaa" in "aaaa.cgi".

(Steps S12 and S13) invoke a GET process control unit 352 with the S identifier as an argument and then end the process described in FIG. 4 if the body is "get".

(Steps S14 and S15) invoke a SET process control unit 353 with the S identifier as an argument and then end the process described in FIG. 4 if the body is "set".

(Steps S16 and S17) invoke an image processing control unit 354 with the S identifier as an argument and then end the process described in FIG. 4 if the body is "image"; otherwise (i.e. in case of a source file) go to Step S13.

Return to FIG. 2, the GET process control unit 352 invokes an HTML translator 355 with a path contained in the S-variable.queryString as an argument. For instance, if a request line is "GET /cgi-bin/get.cgi?htmfile=/start/start.html HTTP/1.1", the S-variable/queryString is "htmfile=/start/start.html", and the path "/start/start.html" is a path to an HTML template file. Upon being invoked, the HTML translator 355 executes a process described in FIG. 5A.

The buffer size table 39 has been stored. In the table 39, as shown in FIG. 5B, a pair of a file path and the number of bytes corresponding to a file size is stored for each of the HTML template files 38. For instance, the number of bytes in the table 39 is equal to the file size, the product of the file size and 1.1, or the sum of the file size and 256 bytes.

(Step S20) read out the number of bytes corresponding to the specified template file from the buffer size table 39.

(Step S21) allocate a temporary memory area in the DRAM 14 in terms of a memory manager 302 of the OS 30 shown in FIG. 1.

(Step S22) read out a statement in a line indicated by a statement line counter SLC from the template file and increase the counter SLC by 1.

(Step S23) go to Step S29 if a statement to be read out in Step S22 does not exist; otherwise go to Step S24.

(Step S24) process the statement as mentioned below if the statement is a directive (i.e. an instruction to the HTML translator 355).

(Steps S25 to S28) if the statement is a context token (hereinafter simply called "token"), write a string replaced with the statement in the temporary memory area, where the string is corresponding to the token; otherwise write the statement without replacement. Next to Step S27 or S28, return to Step S22.

In Step S25, Step S27 and Step S28, the following process is also executed.

(Steps S2A and S2B) if a current vacant area in the temporary memory area is not enough to write data, expand the temporary memory area in terms of the memory manager 302. The temporary memory area is expanded by a predetermined percent (e.g. 10 percent) of the size allocated in Step S20.

Figure 6:
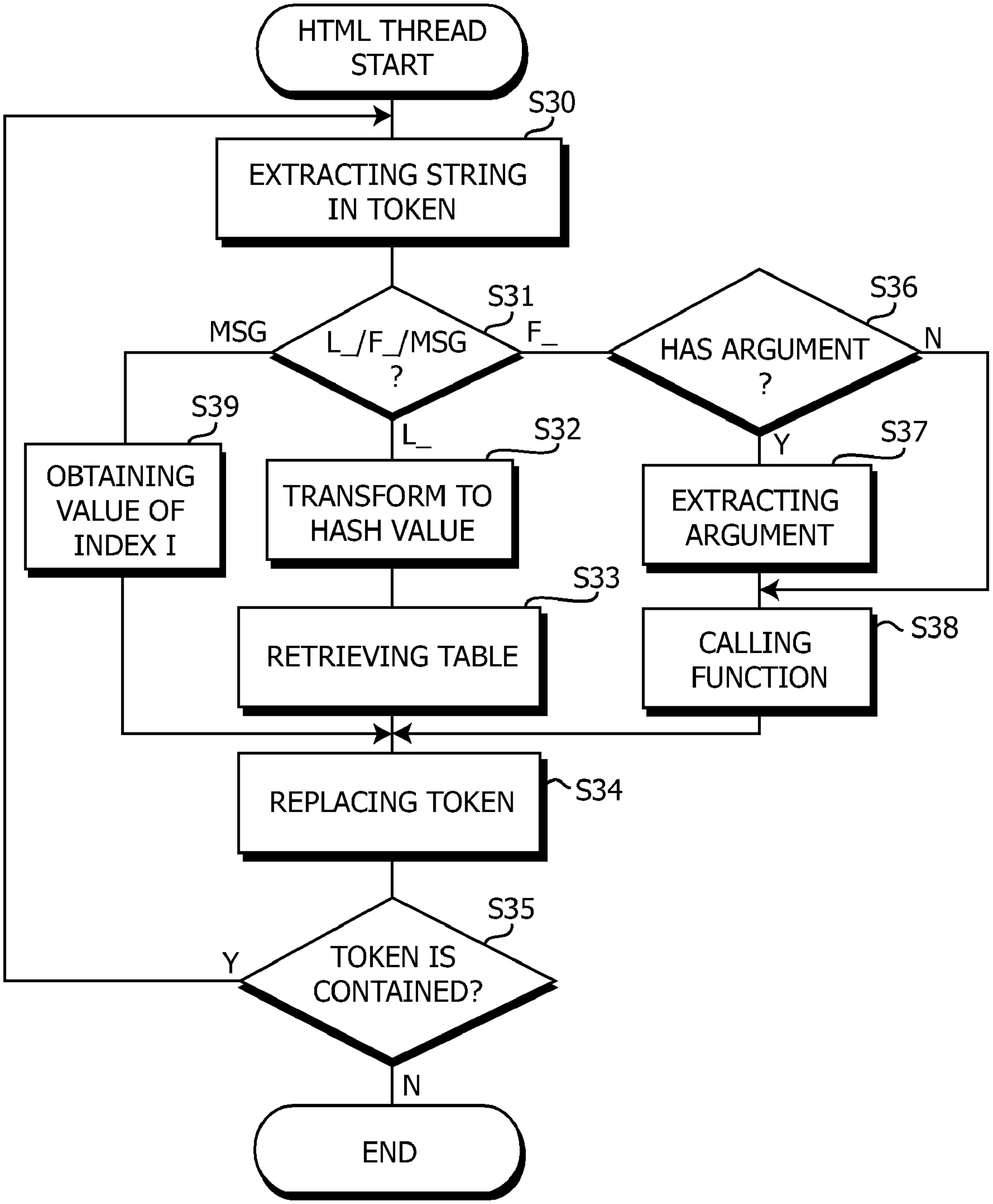
FIG. 6 shows a flowchart that indicates details of Step S27 in FIG. 5A.

FIG. 6 shows a flowchart that indicates details of Step S27.

(Step S30) extract a token body from the token. Here, the token is a string that includes a token beginning symbol "#" and a token ending symbol "#", such as "#L_NetworkSetting#" or "#F_GetIPAddress#". In the token, a string between the token beginning symbol "#" and the token ending symbol "#" is called a token body. The beginning part of the token body indicates the type of the token. In this embodiment, the first two letters "L_" and "F_" in the beginning part indicate a language token and a function token, respectively, and the first three letters "MSG" in the beginning part indicates a message token.

(Step S31) go to Step S32 if the first two letters of the token body are "L_"; go to Step S36 if the first two letters of the token body are "F_"; go to Step S39 if the first three letters of the token body are "MSG".

(Step S32) change a token name to a hash value of it. A token name is a remaining part other than the first two letters in a token body of a language token.

Each of the language table files 40 contains hash values of token names and strings of the token names in a language such as Japanese or English. The language table files 40 contain the strings in respective different languages.

(Step S33) retrieve contents of one of the language table files 40 for the hash value derived in Step S32, and then find a string corresponding to the hash value. The found string is a string in a specified language. For instance, if a language table file of English has been selected from the language table files 40, the string in English is found, and if a language table file of Japanese has been selected from the language table files 40, the string in Japanese is found.

The language has been set as a default at first, and then it is changed as mentioned below. The specified language is kept as a variable "lang" in a lang cookie. The value of the variable "lang" specifies one of the language table files 40. For instance, if lang=0, a language table file of English is specified, and if lang=2, a language table file of Japanese is specified.

(Step S34) replace the token with the value (i.e. the string). For instance, if lang=0 and the language token is "#L_NetworkSetting#", the language token is replaced with a string in English such as "Network Setting".

Respective ones of processing functions 356 have one or more arguments in a common format and one or more return values in a common format. The function "func" can be expressed as "func(chr IN, chr *OUT)" in C programming language. An argument "IN" and an argument "OUT" used as one or more return values are one-dimension dynamic arrays of strings. The number of the symbols "*" with "OUT" is greater by 1 than the number of ones of with "IN" in order to enable itself to set the number of elements (i.e. the number of return values) in "OUT" by the function itself dynamically.

In case of a function token, the token is replaced with a return value *OUT[0] of a function having the function name described in the token. In case of a message token "#MSGi#" where i indicates a natural number, the token is replaced with a return value *OUT[i].

(Step S35) go to Step S30 if the string with which the token has been replaced contains another token; otherwise end the process described in FIG. 6.

(Steps S36 and S37) extract all of one or more arguments from the function token if the function token contains one or more arguments.

An argument of a function token is described in the same format as a query string, and a function token may contain arguments connected with respective delimiters "&". A part from the third letter to a previous letter of the first delimiter (a part from the third letter to the final letter if a delimiter does not exist) in a token body of a function token is called a function name. For instance, in case of the function token "#F_FUNC&ARG1=XXX&ARG2=YYY&ARG3=ZZZ#", the function name in the function token is "FUNC", the value of the argument "ARG1" is "XXX", the value of the argument "ARG2" is "YYY", and the value of the argument "ARG3" is "ZZZ". In general, the value (i.e. a string) of the argument "ARGi" is set in an argument IN[i] of a function, where i is a natural number.

(Step S38) call a function of which the name is contained in the function token. The function is called with one or more arguments contained in the function token. Next to Step S38, go to Step S34.

This function is one of the processing functions 356 in FIG. 2. The function either reads out or changes data in the database 41 in terms of the DBMS 36. The data include various setting values, a remaining amount of toner, the number of printed sheets, or other status information.

(Step S39) extract an index i from the message token #MSGi#, and then go to Step S34.

For instance, the function "getDHCPMode" specified by the function token "#F_getDHCPMode#" outputs *OUT[0] ="#L_dhcp_on#", and then in Step S34 #F_getDHCPMode# is replaced with #L_dhcp_on#.

Next to Step S34, return to Step S30 via Step S35. If lang=0, the string "DHCP ON" in English is obtained in Step S33 and #L_dhcp_on# is replaced with the string "DHCP ON" in Step S34. If lang=2, a string in Japanese is obtained in Step S33 and #L_dhcp_on# is replaced with the string in Japanese in Step S34.

Therefore, the token can be replaced properly according to both the specified function and the specified language.

Further, for instance, if lang=0, a language token #L_jobnum_msg# is replaced with the string "#F_getJobNum# jobs are being processed." in English, and then the function token #F_getJobNum# is replaced with the string "10" (i.e. *OUT [0]="10"). Consequently, the language token #L_jobnum_msg# is replaced with the string "10 jobs are being processed.". If lang=2, a language token #L_jobnum_msg# is replaced with a string in Japanese. The string in Japanese includes the function token #F_getJobNum# at a position different from one in the string in English.

Therefore, even if a string indicating a value (e.g. 10) appears at different positions in an English text and a Japanese text, the string (e.g. "10") can be replaced with at adequate positions.

According to this embodiment, functions in the web application 35 have respective return values in a common format. Therefore, it is possible to use a non-complex configuration of the web application and to design it easily by a team. Consequently, it is possible to shorten a development period to extend or change functions of products.

Further, each of the functions itself can set two or more return values. Therefore, information obtained by execution of a function can be used for different purposes in different places, and consequently it is possible to use a non-complex configuration of the web application.

The DBMS 36 mainly controls change of setting values in the database. For instance, the DBMS 36 limits a range of a setting value, limits the number of clients that change a setting value at the same time to one.

Figure 14A:
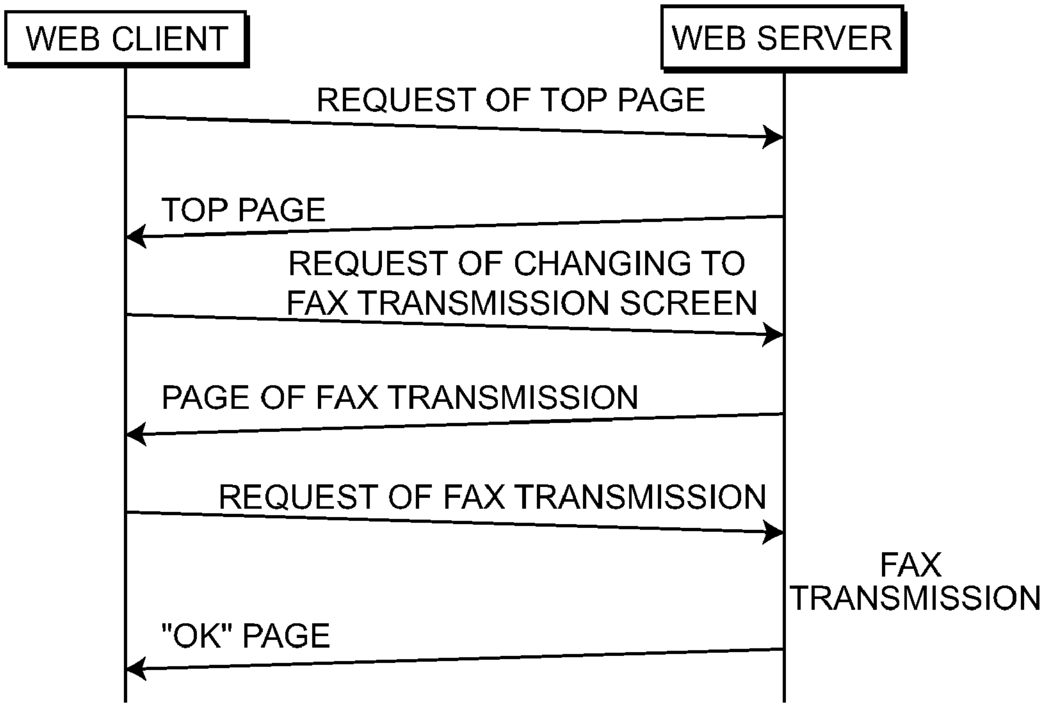
FIG. 14A shows a schematic sequence of message transmission between an web client machine and the image forming apparatus in relation to FIGS. 9A and 9B.
Figure 14B:
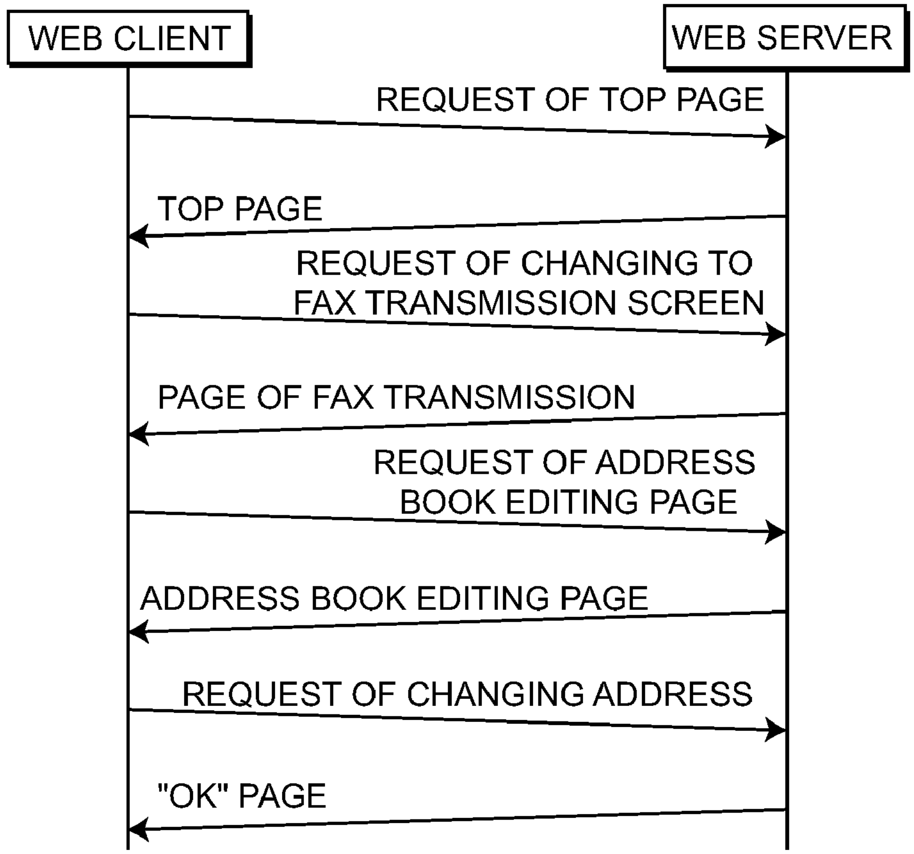
FIG. 14B shows a schematic sequence of message transmission between an web client machine and the image forming apparatus in relation to FIGS. 9A to 9C.

FIGS. 14A and 14B show a schematic sequence of message transmission between the web client machine 20 and the image forming apparatus 10.

Figure 9A:
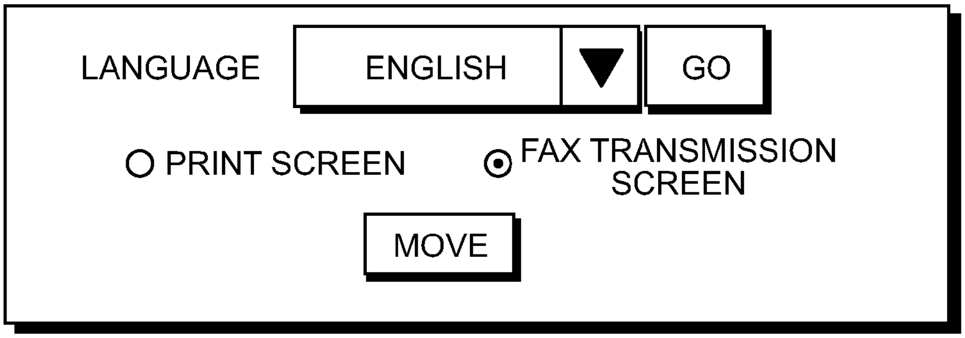
FIGS. 9A to 9C show a top page screen, a FAX transmission screen and an address book editing screen shown on a browser in a client.

In FIG. 14A, an web browser in the web client machine 20 requests a top page of an web site on the image forming apparatus 10, and displays the top page on a screen as shown in FIG. 9A upon receiving the top page from the image forming apparatus 10. An HTML file of this screen contains a form to select a language and a form to make a screen transition to either a print screen or a facsimile transmission screen.

In the form to select a language, a user chooses an item (i.e. a language) in a pull down menu and pushes down the GO button, and a request message that contains information of the selected language is transmitted to the image forming apparatus 10. In the image forming apparatus, a control is sent from the process pre-assigning unit 350 to the GET process control unit 352, and then the GET process control unit 352 causes the HTML translator 355 to replace a language token in a template file of the top page with a string in the selected language and to send a response body to the GET process control unit 352. This response body is the template file that the language token has been replaced with the string. The GET process control unit 352 attaches a response header to the response body to generate a response message. The response header consists of a cookie field of the selected language and another part specified by the HTTP processing thread 341. The HTTP processing thread 341 transmits the response message to the web client machine 20 via the OS 30 and the NIC 18. Upon receiving the response message the web browser of the web client machine 20 displays an web page in the selected language as shown in FIG. 9A. This HTTP processing thread 341 ends itself after transmitting the response message.

After this, a cookie that indicates the selected language is always contained in a request header in each of request messages transmitted from the web client machine 20 to the image forming apparatus 10. Therefore, strings in the selected language are always displayed on the web browser.

Figure 9B:
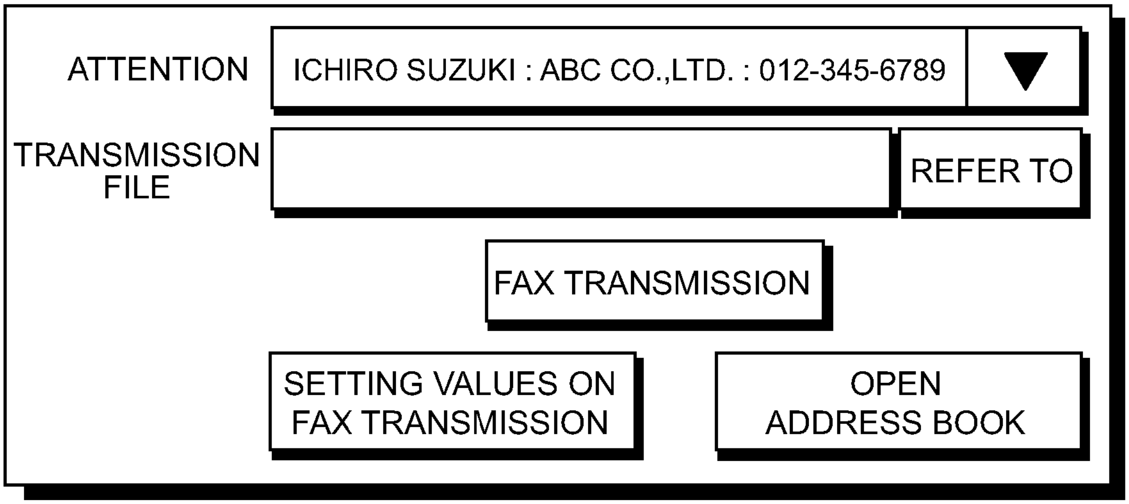

In the form to make a screen transition, a user chooses a radio button of a facsimile transmission screen and pushed down the MOVE button, and a request message in which a request URI contains "get.cgi" is transmitted to the image forming apparatus 10. In the image forming apparatus 10, a response message is generated and transmitted to the web client machine 20. Upon receiving the response message the web browser of the web client machine 20 displays an web page as shown in FIG. 9B.

A user chooses an attention of facsimile transmission in a pull down menu, pushes down the REFER TO button to make the web browser display a file selection dialog, chooses a file to be transmitted from files stored in a hard disk drive in the web client machine 20, and pushes down the FAX TRANSMISSION button, and a request message that contains the selected attention and contents of the selected file is transmitted to the image forming apparatus 10.

For instance, in case that a request line in this request message is "POST /cgi-bin/image.cgi HTTP/1.1", since the file name is "image.cgi", a control is sent from the process assigning unit 350 to the image processing control unit 354. For instance, a query string in a request body of this message is "func=sendFax&arg0=sendfile.pdf&arg1=1&okhtmfile=OK.html&failhtmfile=NG.html", and this is stored in the S-variable.queryString. The image processing control unit 354 sends the S identifier to the image processing unit 357, and upon this the image processing unit 357 calls the function "sendFax" of the processing functions 356 with IN[0]="sendfile.pdf" and IN[1]="1" as arguments. The function "sendFax" obtains setting values required to facsimile transmission from either the database 41 or a cookie mentioned below in terms of a setting-value-obtaining function in the processing functions 356. This process is also executed in image processing other than facsimile transmission. The function "sendFax" converts contents of the file "sendfile.pdf" (specified by the first argument) to an image data for facsimile transmission in consideration of the obtained setting values, and transmits the image data of facsimile to the first attention (specified by the second argument) in an address book.

Information on the result (i.e. success/failure) of the facsimile transmission is set in a return value *OUT[0] in the function "sendFax" and the return value is provided to the image processing control unit 354 through the image processing unit 357. The image processing unit 354 provides a path of a template file to the GET process control unit 352 in order to generate an HTML file for a response. Here, if *OUT[0] ="OK", the template file is "OK.HTML" specified by the query string and the HTML file is "OK.HTM"; and if *OUT [0]="NG", the template file is "NG.HTML" specified by the query string and the HTML file is "NG.HTM". In this embodiment, an extension of the template files has been set as "HTML" and an extension of the generated files is set as "HTM".

As shown in FIG. 11A the template file "OK.HTML" contains a message token #MSG1#, and as shown in FIG. 11C the template file "NG.HTML" contains message tokens #MSG1# and #MSG2#. The message tokens #MSG1# and #MSG2# are replaced with *OUT[1] and *OUT[2] respectively in Steps S39 and S34 of FIG. 6 executed by the HTML translator 355. Consequently, HTML files "OK.HTM" and "NG.HTM" shown in FIGS. 11B and 11D are generated from the template files "OK.HTML" and "NG.HTML" respectively. In the GET process control unit 352 and the HTTP processing thread 341, a response header is attached to each of the HTML files to generate a response message and the response message is transmitted to the web client machine 20.

Figure 10:
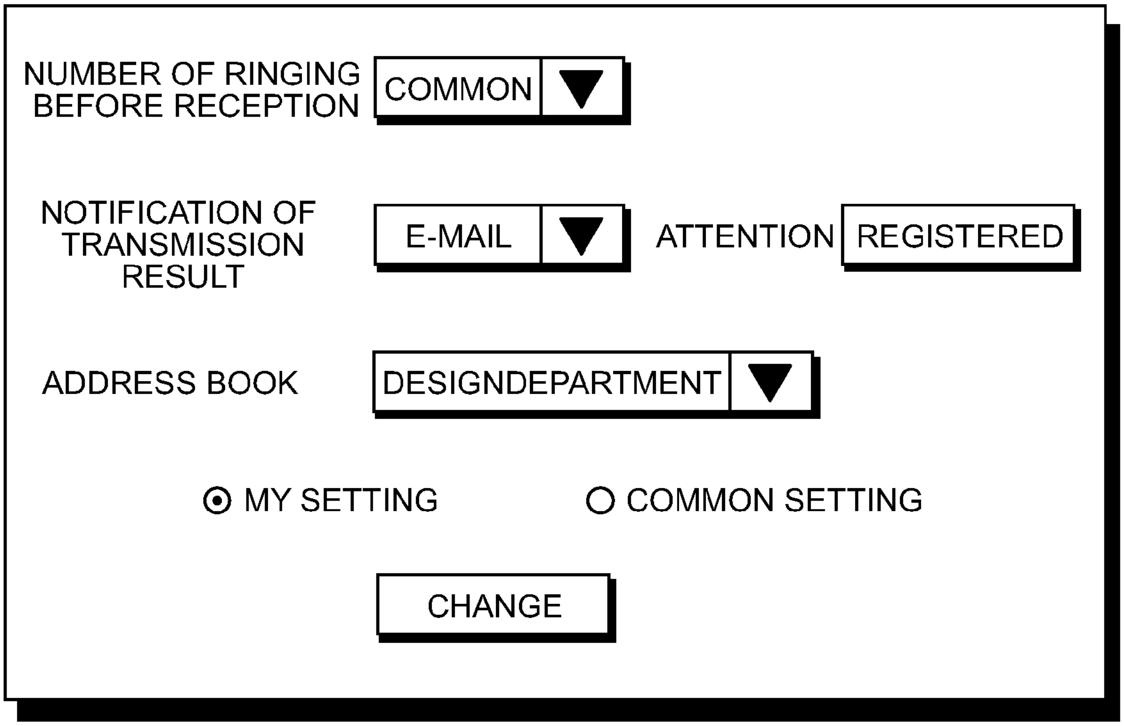
FIG. 10 shows a setting value changing screen on FAX transmission displayed on a browser in a client.

In order to notify a user of the result according to a setting, the GET process control unit 352 generates an email that contains the same contents as the HTML file OK.HTM or NG.HTM, and stores it in a mailbox of the mail transmission server 33 (see FIG. 10).

According to this embodiment, respective ones of the processing functions 356 have respective return values in a common format. Therefore, response bodies that indicate the result of image processing and the result of changing a setting value are generated based on the same template file OK.HTML or NG.HTML, as well as one for facsimile transmission. Consequently, it is possible to use a non-complex configuration of the web application.

Further, even if respective different template files are used according to types of processes, since return values of functions are related to respective message tokens in a common manner, a template file for indicating results of processes can be prepared easily, for example, as shown in FIG. 11E. FIG. 11F shows an HTML file "OK.HTM" generated from the template file shown in FIG. 11E.

Return to FIG. 9B, the number of attentions contained in the pull down menu is changed when an attention is added/deleted according to a user operation on a screen shown in FIG. 9C mentioned below. A template file, for instance, shown in FIG. 12A can be used regardless of changing the number of attentions. This template file contains a FOR directive "<!--FOR F_GETCOUNTOFADDRESS--" and an END_FOR directive "<!--END_FOR--". A directive is identified in terms of its beginning symbol "<!--" and its ending symbol "-->".

At least one statement placed between a FOR directive and an END_FOR directive is processed repeatedly by the number of times specified in the FOR directive. The number of times is described as either a constant or a function token as a variable (without a token identifying symbol "#") In FIG. 12A, the function token "F_GETCOUNTOFADDRESS" is set as the number of times in the FOR directive, and when an HTML file is generated from this template file, the function "GETCOUNTOFADDRESS" specified by the function token is executed to obtain the number of attentions in an address book and then the function token is replaced with a return value *OUT[0] (i.e. a value of the number of attentions) of the function.

The symbol "F_M_" in a token "#F_M_COUNT&ARG1=0#" contained in an OPTION tag indicates that the function "COUNT" is a multi-return-value function. The function described with the symbol "F_M_" has arguments and return values in a common format as mentioned above, but an internal counter i counts the number of iteration on the FOR directive, and only when the value of the counter is an initial value 0 (i.e. only at the first iteration), this function is called to obtain return values and then the multi-return-value function token "#F_M_COUNT&ARG1=0#" is replaced with *OUT[i] (i.e. one of the return values) at the i-th iteration (for i=0 or i>0). As well as this, a multi-return-value function token #F_M_GETADDRESS# to set the i-th attention in an address book to *OUT[i] is replaced repeatedly in the same manner.

Figure 5A:
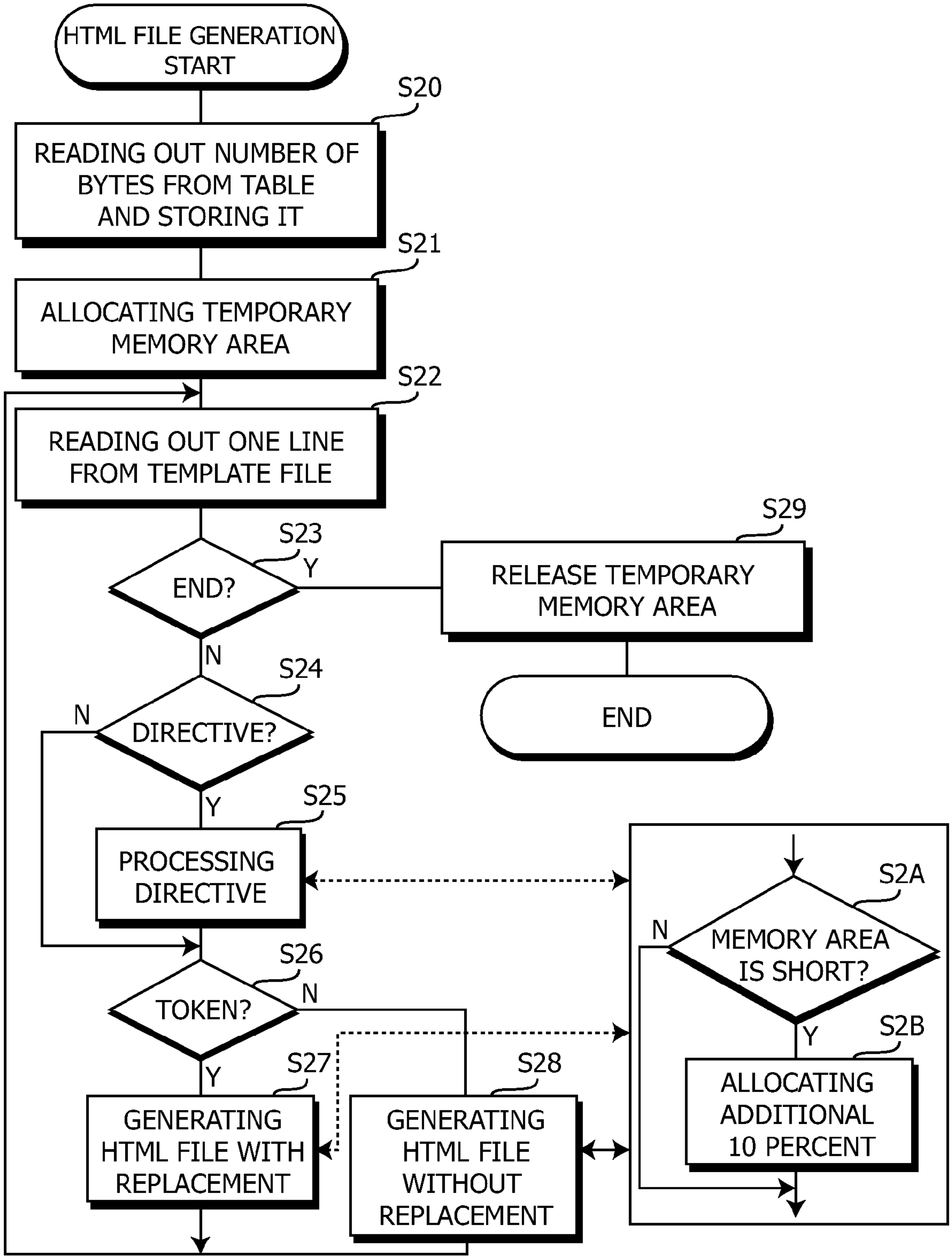
FIG. 5A shows a flowchart that indicates a process executed by the HTML translator in FIG. 2
Figure 7:
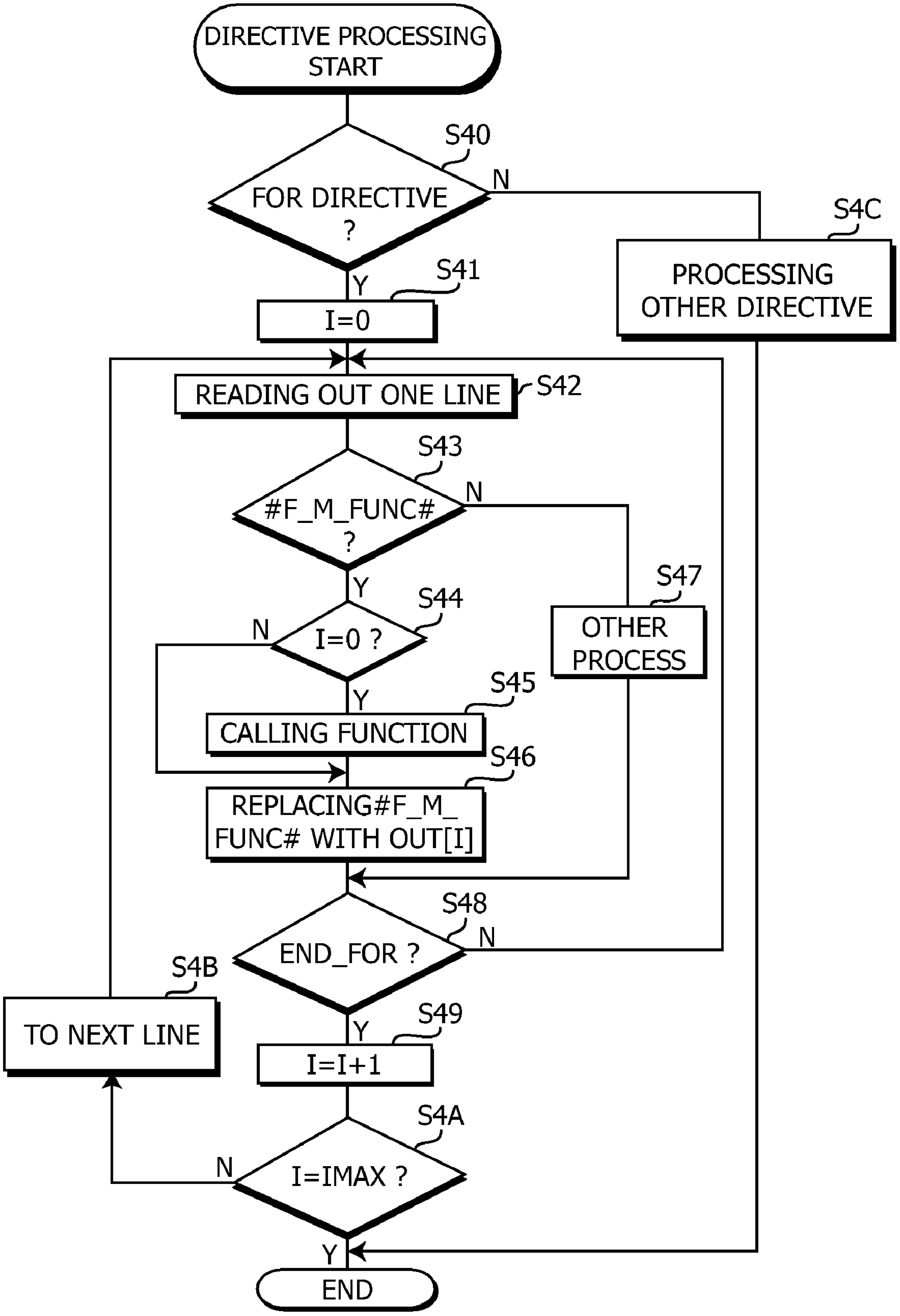
FIG. 7 shows a flowchart that indicates details of processing a for directive in Step S25 of FIG. 5A.

The directive is processed in Step S25 in FIG. 5A. FIG. 7 shows a flowchart that indicates details of processing a FOR directive.

(Step S40) go to Step S41 if a FOR directive was found; otherwise go to Step S4C.

(Step S41) set an initial value 0 to the counter i and set an initial value SLCO of the counter SLC that indicates a line number of a statement in a template file processed currently.

(Step S42) read out a statement at the line indicated by the counter SLC from the template file, and increase the counter by 1.

(Step S43) go to Step S44 if this statement contains a multi-return-value function token; otherwise go to Step S47.

(Steps S44 and S45) call a function specified by the multi-return-value function token only if i=0. If the token contains the one or more arguments, the one or more arguments is/are extracted from the token, and the function is called with the one or more arguments. For instance, in case that the token is "#F_M_COUNT&ARG1=0#", the function "COUNT" is called with an argument IN[0] that the value zero is set to. An integer that is the sum of an integer variable i (i.e. the counter i) and an integer converted from IN[0] is converted to a string, and the string is set to *OUT[i] of the function "COUNT".

(Step S46) replace the multi-return-value function token with the value (i.e. the string) of *OUT[i], and then go to Step S48.

(Step S47) execute a process specified by the statement.

(Step S48) go to Step S49 if an END_FOR directive was found; otherwise go to Step S42.

(Step S49) increase the counter i by 1.

(Step S4A) end the process described in FIG. 7 if the value of the counter i is the value imax specified in the FOR directive; otherwise go to Step S4B.

(Step S4B) set an initial value SLCO to the statement line counter SLC, and go to Step S42.

(Step S4C) execute the process specified by another directive, and then end the process described in FIG. 7.

A process described in FIG. 5A contains such processes. In terms of the process described in FIG. 5A, for instance, an HTML file shown in FIG. 12B as a response body is generated based on a template file shown in FIG. 12A by the HTML translator 355.

Comparing FIG. 12B with FIG. 12A, it is apparent that a pull down menu with any number of items can be generated from a non-complex template file. The aforementioned FOR directive is analogized to another control loop like WHILE statement or DO-LOOP in C program language etc. Therefore, another control loop is available in template files.

For example of a SET process, a process to add, change or delete an item (i.e. an attention) in an address book is explained next.

Figure 9C:
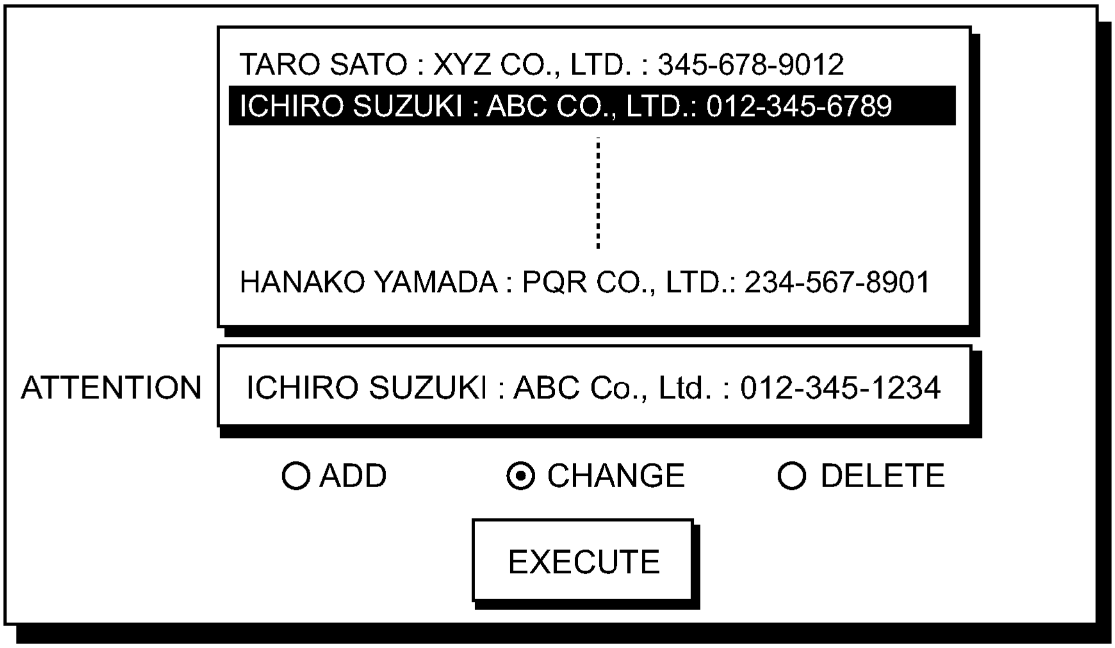

FIG. 14B shows a schematic sequence of message transmission between the web client machine 20 and the image forming apparatus 10 in relation to FIGS. 9A to 9C. This sequence indicates a case that after a screen transition from FIG. 9A to FIG. 9B, a screen transition to FIG. 9C is made upon detecting a click to the "OPEN ADDRESS BOOK" button and then a process of editing the address book is executed successfully.

A request message is generated upon detecting a click to the "OPEN ADDRESS BOOK" button. A response message corresponding to the request message is generated as well as a response message corresponding to a request message generated upon detecting a click to the "MOVE" button in FIG. 9A as mentioned above. This response message, for example, shown in FIG. 13B is generated based on a template file shown in FIG. 13A by the HTML translator 355. A FOR directive and a multi-return-value function token in FIG. 13A are the same as ones in FIG. 12A.

In FIG. 9C, upon detecting a click to an item in a list box, the item is displayed in a reverse colors, and an on-click event handler is called in a client, and the on-click event handler causes to display a value of the selected item in an attention box. In this condition, a user either chooses the "DELETE" radio button or chooses the "CHANGE" radio button after changing a string in the attention box, and then the user pushes down the "EXECUTE" button. As a result, a request message is generated and transmitted to the image forming apparatus 10. The request message contains data in the attention box, data indicating the selection of either "DELETE" or "CHANGE", and one or more attribution values of a FORM tag shown in FIG. 13B.

In the image forming apparatus 10, the SET process control unit 353 is started with the S identifier corresponding to this message as an argument, and the specified attention in an address book stored in the database 41 is updated or deleted in terms of one of the processing functions 356 and the DBMS 36.

In another case, a user inputs an attention to be added on the attention box shown in FIG. 9C, chooses the "ADD" radio button and pushes down the "EXECUTE" button. As a result, as well as the aforementioned process, a request message is generated and transmitted to the image forming apparatus 10. The request message contains this attention, data indicating the selection of "ADD", and one or more attribution values of a FORM tag shown in FIG. 13B. In the image forming apparatus 10, in terms of the SET process control unit 353, one of the processing functions 356 and the DBMS 36, the attention is added to an address book stored in the database 41.

In another case of changing a setting value, on a screen shown in FIG. 9B, if a user pushes down the "SETTING VALUES ON FAX TRANSMISSION" button on a screen shown in FIG. 9B, then the web client machine 20 transmits a request message to the image forming apparatus 10 and receives a response message from the image forming apparatus 10. The response message is used to display a screen shown in FIG. 10. This screen contains a drop down list for selecting the number of ringing before starting a facsimile receipt, a drop down list for selecting a method to notify a result of facsimile transmission, an attention of the result of facsimile transmission, and a drop down list for selecting an address book. The drop down list for selecting a method to notify the result contains items of "E-MAIL", "CELLULAR PHONE" and "NOTHING".

Here, in the database 41 shown in FIG. 2, for each of clients, a client ID and attention addresses for respective methods to notify the result are registered. If the attention in FIG. 10 is set as "REGISTERED", the registered attention address is used to transmit the result of facsimile transmission.

An address book selected in FIG. 10 is used in screens shown in FIGS. 9B and 9C.

A "my" setting and a common setting are available as types of setting values. A "my" setting is a private setting of each of clients, and a common setting is a setting common to all clients.

A "my" setting is contained in a cookie, and is used instead of a part or all of a common setting without changing the common setting. The value of the cookie is used in a setting-value-obtaining function in the processing functions 356. That is, if a cookie that contains a necessary value exists, this function uses the value of the cookie, and if any of cookies that contains a the value does not exist, this function obtains the value (i.e. the value in the common setting) via the DBMS 36 from the database 41.

A common setting contains setting values that have been stored in the database 41. The setting values in the database 41 are used for items other than the items specified by the cookie. Therefore, a setting-value-obtaining function in the processing functions 356 obtains necessary common setting values from the database 41 other than setting values specified by the cookie of the "my" setting. "COMMON" in FIG. 10 means using a common setting without any changes rather than a "my" setting in a cookie. Change of the common setting is permitted only while a user logs in with administrator privilege. Whether a user logs in with administrator privilege or not is determined in terms of an authentication cookie mentioned below.

While a user logs in with administrator privilege, a setting-value-obtaining function in the processing functions 356 obtains common setting values from the database 41.

Figure 8:
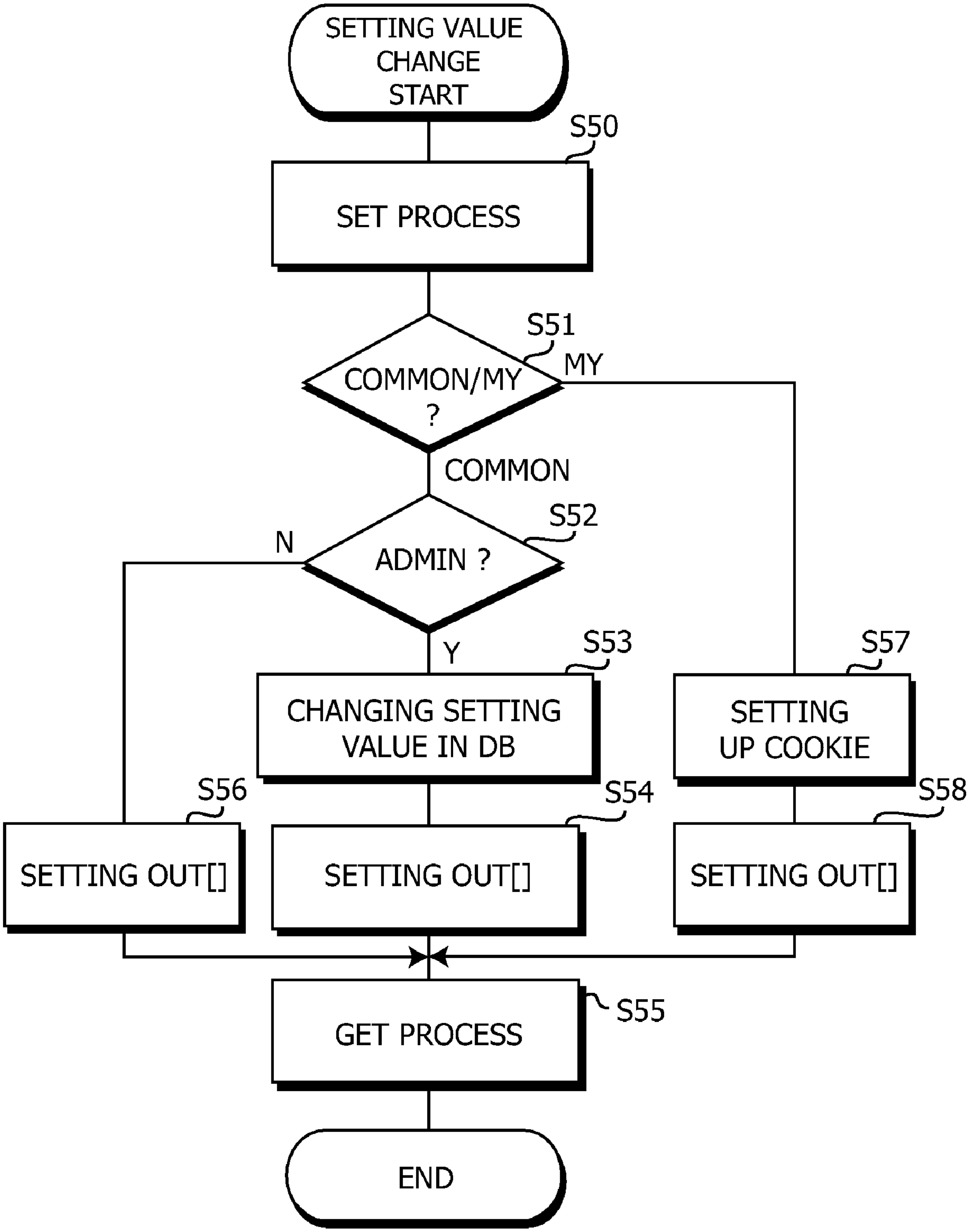
FIG. 8 shows a flowchart that indicates a process executed by the SET process control unit and other related parts in the image forming apparatus upon detecting that "CHANGE" button is pushed down on a browser shown in FIG. 10.

In FIG. 10, in case that a user pushes down the "CHANGE" button, a request message that contains information indicated in FIG. 10 is transmitted to the image forming apparatus 10, and then in the image forming apparatus 10, the SET process control unit 353 and related parts execute the process described in FIG. 8.

(Step S50) the SET process control unit 353 calls a function for changing setting values on facsimile transmission. For instance, the function is called with arguments of IN[0] ="MY", IN[1]="COMMON", IN[2]="E-MAIL", IN[3] ="SAME" and IN[4]="DESIGNDEPARTMENT". IN[0] ="MY" means using a "my" setting. IN[1]="COMMON" means using a common setting for the number of ringing before starting facsimile reception. IN[2]="E-MAIL" means that the method to notify the result is email. IN[3]="SAME" means that the attention is identified as "REGISTERED". IN[4]="DESIGNDEPARTMENT" means that the specified address book is "DESIGNDEPARTMENT".

(Step S51) the function determines which of a common setting and a "my" setting has been selected according to IN[0]; if a common setting has been selected, go to Step S52; if a "my" setting has been selected, go to Step S57.

(Step S52) the function determines whether or not the user logs in with administrator privilege; if the user logs in with administrator privilege, go to Step S53; otherwise go to Step S56.

(Step S53) the function updates setting values in the database 41 with the values of IN[0] to IN[4]. However, if IN[1] ="COMMON", the number of ringing before starting facsimile receipt in the common setting is not updated; and if IN[3]="SAME", the attention in the common setting is not updated.

(Step S54) the function sets "OK" in *OUT[0] if the DBMS 36 permits changing the setting value corresponding to IN[3]. If the DBMS 36 prohibits changing the setting value corresponding to IN[3], the function sets "NG" in *OUT[0] and sets a string indicating a cause of the prohibition in *OUT[1]. Then, the function ends, and a control returns to the SET process control unit 353.

(Step S55) the SET process control unit 353 invokes the GET process control unit 352 with an argument. If *OUT[0] is "OK", the argument is a path to "OK.HTML"; if *OUT[0] is "NG", the argument is a path to "NG.HTML"; and if *OUT[0] is "NotAuth", the argument is a path to "NOTAUTH.HTML".

Upon being invoked, the GET process control unit 352 causes the HTML translator 355 to generate an HTML file based on a template file specified by the argument, and attaches a part of a response header to the HTML file as a response body. If NOTAUTH.HTM is generated, NOTAUTH.HTM contains a form of input boxes to input a user ID and a password. The GET process control unit 352 causes the HTTP processing thread 341 to attaches the remaining part of the response header in order to generate a response message and to transmit the response message to the web client machine 20. Then, the process described in FIG. 8 ends.

Alternatively, a user ID and a password may be input on the top page in an web site of the image forming apparatus 10.

(Step S56) sets "NotAuth" in *OUT[0], and then go to Step S55.

(Step S57) set names and values of setting values in a cookie. The names and values of setting values are obtained from elements in a structure variable identified with the S identifier. In case shown in FIG. 10, except for ones that the value is either "COMMON" or "REGISTERED", names and values of setting values are set in a cookie. This cookie is contained in a header in Step S55.

(Step S58) if IN[1] is not "COMMON", determine whether or not predetermined conditions are satisfied on the number of characters, etc; if the conditions are satisfied, set "OK" to *OUT[0]; otherwise set "NG" to *OUT[0] and a cause to *OUT[1]; and then go to Step S55.

According to the aforementioned process, both of a "my" setting and a common setting are available, and consequently it is possible to provide respective different services to users.

Further, the SET process control unit 353 causes the GET process control unit 352 to generate a response body corresponding to the result (i.e. success/failure) of the process in the SET process control unit 353. Therefore, since a GET process is available in a SET process, it is possible to use a non-complex configuration of the web application 35.

It should be noted that a common setting may be changed in terms of operations to the operation panel 15 with administrator privilege.

Further, in case that it is determined that the user does not have a valid authority (i.e. an administrator privilege), a user ID and a password are input on a screen displayed based on NOTAUTH.HTM by an web browser in the web client machine 20, and then a request message that contains the user ID and the password is transmitted to the image forming apparatus 10. A request line of this message is, for example, "POST /cgi-bin/login.cgi HTTP/1.1". In the image forming apparatus 10, the authentication control unit 351 is started with the S identifier as an argument.

The authentication control unit 351 calls the function "Auth" in the processing functions 356 with arguments that are the user ID and the password stored in elements of the S variable specified with the S identifier. This function determines whether or not a pair of the user ID and the password has been registered in the database 41 in terms of the DBMS 36. If it is determined that the pair has been registered, this function sets "OK" to *OUT[0]. If it is determined that the pair has not been registered, this function sets "NotAuth" to *OUT[0]. According to the value of *OUT[0], the authentication control unit 351 executes the process to generate a response message as well as a SET process. However, in case that *OUT[0]="OK", the authentication control unit 351 adds an authentication cookie in a response header of the response message. The authentication cookie, for example "Set-Cookie: login=admin_1068625073", indicates that the user has been authenticated and also indicates whether or not the user has administrator privilege. After the web client machine 20 receives this cookie, each of request messages from the web client machine 20 to the image forming apparatus 10 contains this cookie.

In this embodiment, in the web application 35, the process assigning unit 350 sends a control to any of the process control units 351 to 354 according to a file name in a path contained in a request URI from a client, and upon receiving the control one of the process control units 351 to 354 executes a process with using at least one function in the processing functions 356 directly or indirectly. Therefore, a feature of the web server 34 is extended or changed easily by adding a new function to the processing functions 356, by changing at least one of the processing functions 356, or by adding a new process control unit to the process control units 351 to 354. Consequently, a development period of a new product can be shortened.

The description of the present invention has been presented for purposes of illustration and description, and is not intended to be exhaustive or limited to the invention in the form disclosed. Many modifications and variations will be apparent to those of ordinary skill in the art.

For example, ASP, JSP or the like may be used instead of CGI in the aforementioned embodiment.

Further, in the aforementioned embodiment, a return value of a function may be a value of the function itself rather than a value set on an argument, and a function may be either a member function in a class or a subroutine in a programming language that subroutine is distinguished from function. In case of a member function, input data to the member function may be provided via member variables instead of arguments.

Further, in the aforementioned embodiment, a template file may be used to generate other files such as XML file than HTML files.

Furthermore, in the aforementioned embodiment, the message token may be used for one other than a message.

Furthermore, in the aforementioned embodiment, in Step S3 of FIG. 3, a control may go to Step S2 if the extension indicates that the file is a template file. In addition, in FIG. 4, a control may go to Step S13 if the extension is not "cgi". The path in the source file item and paths compared with the path in the source file item may be real paths.

Further, in the aforementioned embodiment, processes described in FIG. 3 and FIG. 4 may be united. In addition, configuration without the DBMS 36 is also available. The main web server 34, the web application 35 and the DBMS 35 may run as respective processes.

Further, in the aforementioned embodiment, the HTTP processing thread 340 that has functions of an inetd and an httpd may be used without using the inetd 31 and the httpd Furthermore, in the aforementioned embodiment, the image forming apparatus is used as an instance of an information processing apparatus. Alternatively, this invention can be applied to other electronic devices.

What is claimed is:

1. An information processing apparatus comprising:

a processor; and a memory unit connected to the processor, the memory unit storing an web application and a template file, wherein the web application comprises:

a function, and a translator that causes the processor to replace a context token in the template file with a return value of the function in order to generate a response body, the context token containing an identifier, the function has a plurality of return values specified with the identifier;

wherein the web application has a plurality of functions and the functions have respective return values in a common format, and the context token is replaced with any of the return values of the functions wherein the memory unit stores a database and template files, and the web application comprises:

a GET process control unit that causes the processor to generate a response body based on one of the template files in terms of the translator, and a SET process control unit that causes the processor to change setting data in the database through one of the functions corresponding to a query string from a client and to send a control to the GET process control unit with designation of the template file selected according to the query string and the result of changing the setting data, wherein the template file contains the context token wherein the web application further comprises an image processing control unit that causes the processor to process contents of a file specified in a request massage from a client and to send a control to the GET process control unit with designation of the template file selected according to the query string and the result of processing the contents of the file, and the template file contains the context token.

2. The information processing apparatus according to claim 1, wherein each of the return values is an element value in one of arrays, and the identifier is an index that specifies the element value in the array.

3. The information processing apparatus according to claim 1, wherein the return values contain a value indicating the result of changing the setting data and further contain a value indicating a cause of the result if the result indicates failure.

4. An information processing apparatus comprising:

a processor; and a memory unit connected to the processor, the memory unit storing an web application and template files, wherein the web application causes the processor to generate a response body with executing the steps of:

(a) replacing a context token in one of the template files specified by a request message from a client with a predetermined string, and (b) performing the process (a) again if the string contains another context token;

wherein in the process (a), the web application causes the processor to determine the type of the context token according to an identification code contained in the context token and replace the context token with a string according to a rule corresponding to the type of the context token;

wherein the memory unit further stores replacement tables of respective languages, and each of the replacement tables has token identifiers and strings corresponding to the respective token identifiers, and if the identification code in the context token indicates that the context token is a language context token, in the process (a), the web application causes the processor to determine a replacement table corresponding to a language specified by the context token, to retrieve contents of the replacement table for a token identifier corresponding to the context token, and to replace the context token with a string corresponding to the token identifier.

5. The information processing apparatus according to claim 4, wherein the memory unit further stores a database, and if the identification code in the context token indicates that the context token is a function context token, in the process (a), the web application causes the processor to replace the context token with a string derived from a function of which the name is contained in the context token, and the function causes the processor to obtain the string from the database.

6. The information processing apparatus according to claim 5, wherein at least one of the strings in the replacement tables contains the function context token.

* * * * *